United States Patent
Zhang et al.

(10) Patent No.: US 12,002,605 B1
(45) Date of Patent: Jun. 4, 2024

(54) FABRICATION METHODS FOR ELECTRONIC DEVICES INTEGRATING MAGNETIC NANOSTRUCTURES

(71) Applicant: UCHICAGO ARGONNE, LLC, Chicago, IL (US)

(72) Inventors: Yuepeng Zhang, Naperville, IL (US); John N. Hryn, Hawthorn Woods, IL (US); Yunsong Xie, Austin, TX (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 495 days.

(21) Appl. No.: 17/176,506

(22) Filed: Feb. 16, 2021

(51) Int. Cl.
| | |
|---|---|
| H01F 41/30 | (2006.01) |
| C25D 1/00 | (2006.01) |
| H01F 1/00 | (2006.01) |
| H01F 1/14 | (2006.01) |
| H01F 41/02 | (2006.01) |
| B82Y 25/00 | (2011.01) |
| B82Y 40/00 | (2011.01) |

(52) U.S. Cl.
CPC ........... *H01F 1/0081* (2013.01); *C25D 1/006* (2013.01); *H01F 1/143* (2013.01); *H01F 41/0253* (2013.01); *H01F 41/30* (2013.01); *B82Y 25/00* (2013.01); *B82Y 40/00* (2013.01)

(58) Field of Classification Search
CPC .... H01F 41/0253; H01F 41/30; H01F 1/0081; H01F 1/143; B82Y 25/00; B82Y 40/00; C25D 1/006
See application file for complete search history.

(56) References Cited

U.S. PATENT DOCUMENTS

| | | |
|---|---|---|
| 7,211,175 B1 | 5/2007 | Mayer et al. |
| 2005/0082174 A1 | 4/2005 | Kendig et al. |
| 2008/0187764 A1 | 8/2008 | Jung et al. |
| 2009/0255820 A1 | 10/2009 | Buttard |

(Continued)

FOREIGN PATENT DOCUMENTS

| | | | |
|---|---|---|---|
| JP | 2013214656 A | * | 10/2013 |
| KR | 20140073475 A | | 6/2014 |

OTHER PUBLICATIONS

Mousaeei et al, "Design and fabrication of microwave circulators based on ferromagnetic nanowires," 2020 3rd West Asian Symposium on Optical and Millimeter-wave Wireless Communication (WASOWC), Tehran, Iran, 2020, pp. 1-4. (Year: 2020).*

(Continued)

*Primary Examiner* — A. Dexter Tugbang
(74) *Attorney, Agent, or Firm* — MARSHALL, GERSTEIN & BORUN LLP

(57) ABSTRACT

Magnetic nanowire components may be used in passive radio-frequency device allowing for smaller size devices, lower power consumption, and on-chip packaging potential across a wide range of technologies. A method for fabricating magnetic nanowire component electronic devices include depositing a conductive device pattern and transmission lines onto a substrate, aligning and securing a magnetic nanowire component to the device pattern, packaging the device with an insulation layer. Alternatively, the conductive device pattern and transmission lines may be deposited on the magnetic nanowire component, and the magnetic nanowire component may then be attached to a substrate.

8 Claims, 19 Drawing Sheets

(56) References Cited

U.S. PATENT DOCUMENTS

| | | | |
|---|---|---|---|
| 2010/0032737 A1* | 2/2010 | Seol | B82Y 25/00 |
| | | | 257/295 |
| 2011/0171137 A1 | 7/2011 | Patolsky et al. | |
| 2013/0045416 A1 | 2/2013 | Seferos et al. | |
| 2017/0025729 A1 | 1/2017 | Chen et al. | |
| 2019/0108941 A1* | 4/2019 | Rong | H01F 41/0253 |

OTHER PUBLICATIONS

Kerckhoven et al., "Substrate integrated waveguide isolator based on ferromagnetic nanowires in porous alumina template." Appl. Phys. Lett. 105, 183107 (2014).

Hamoir et al., "Self-biased nonreciprocal microstrip phase shifter on magnetic nanowired substrate suitable for gyrator applications," *IEEE Transactions on Microwave Theory and Tech.* 60 (7), 2152-2157 (2012).

De La Torre Medina et al., "Double ferromagnetic resonance and configuration-dependent dipolar coupling in unsaturated arrays of bistable magnetic nanowires," *Phys. Rev. B* 81, 144411 (2010).

Carignan et al., "Ferromagnetic Nanowire Materials: Theory and Applications," *IEEE Trans. Microwave Theo. Tech.* 59, 2568 (2011).

Aslam et al., "Microwave monolithic filter and phase shifter using magnetic nanostructures," *AIP Adv.* 8, 056624 (2018).

Kou et al., "Tunable ferromagnetic resonance in NiFe nanowires with strong magnetostatic interaction," *Appl. Phys. Lett.* 94, 112509 (2009).

Kou et al., "Microwave Permeability and Tunable Ferromagnetic Resonance in Cobalt Nanowire Arrays," *IEEE Trans. Magn.* 46, 1143 (2010).

Pan et al., "Microwave absorption properties of the Ni nanofibers fabricated by electrospinning," *Appl Phys A* 113, 755 (2013).

Darques et al., "Microwave circulator based on ferromagnetic nanowires in an alumina template," *Nanotechnology*, 21 (2010).

Caloz et al., "Recent Advances in Micro-structured Electric and Nano-Structured Magnetic Microwave Metamaterials," *IEEE* (2010).

Office Action for U.S. Appl. No. 16/437,813, dated Jan. 19, 2021.

Office Action for U.S. Appl. No. 16/437,813, dated May 4, 2021.

* cited by examiner

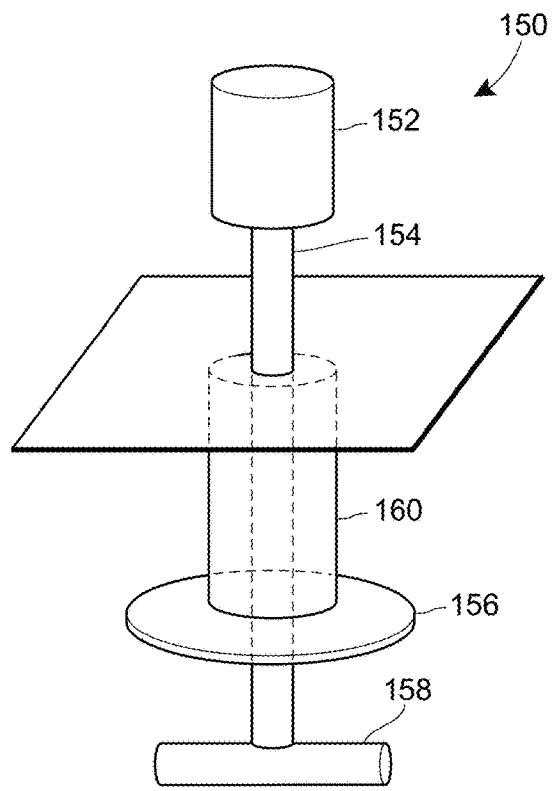
FIG. 3A
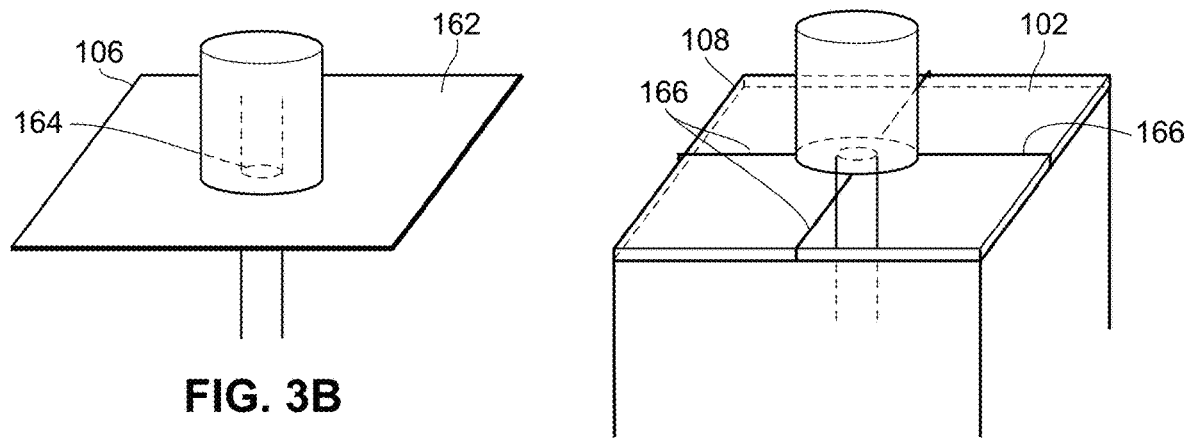
FIG. 3B
FIG. 3C

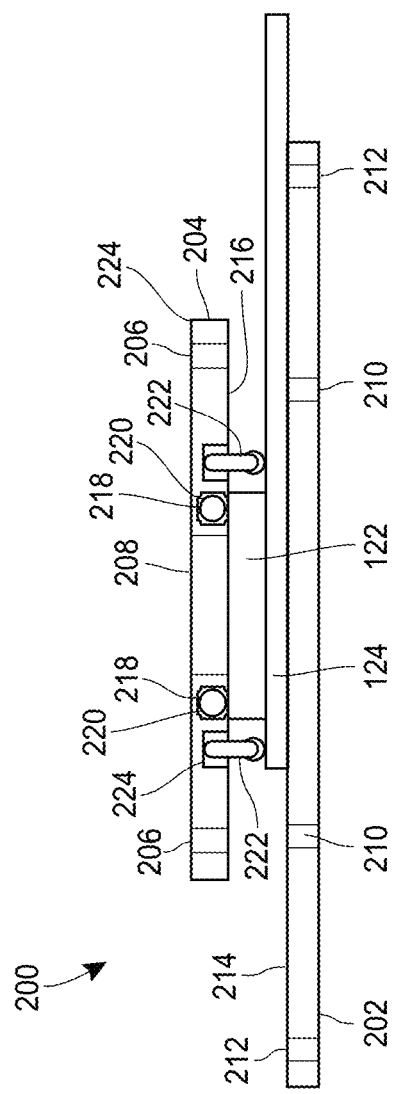

FABRICATION METHODS FOR ELECTRONIC DEVICES INTEGRATING MAGNETIC NANOSTRUCTURES

STATEMENT REGARDING FEDERALLY SPONSORED RESEARCH OR DEVELOPMENT

This invention was made with Government support awarded by Defense Advanced Research Projects Agency (DARPA). This invention was made with government support under Contract No. DE-ACO2-06CH11357 awarded by the United States Department of Energy to UChicago Argonne, LLC, operator of Argonne National Laboratory. The government has certain rights in the invention. This document is under Distribution Statement A—Approved for Public Release, Distribution Unlimited.

FIELD OF THE DISCLOSURE

The present disclosure relates to a method and system fabricating magnetic nanowire composite electronic devices, in particular, for fabricating nanowire components and integrating magnetic nanowire components into radio-frequency devices.

BACKGROUND

Nanowires are cylindrical or wire-like structures with diameters on the order of a nanometer. Soft magnetic nanowires are a unique group of nanowires that can reserve magnetization after the external magnetic field is removed due to their high length-to-diameter aspect ratio. Also based on this aspect ratio, the nanowires can exhibit anisotropic magnetic and electrical properties along their long axial direction. Such self-biased magnetic properties make soft magnetic nanowires a desirable magnetic component in self-biased radio frequency (RF) devices, such as non-reciprocal devices (e.g., circulators, isolators) and non-linear devices (such as signal-to-noise enhancers). Because soft magnetic nanowires can be good passive (i.e., self-biased) RF components. The devices that use soft magnetic nanowires can eliminate bulky external permanent magnets used to provide a required magnetic field to the traditional field-dependent magnetic component in RF devices. Thus, the nanowire-based self-biased devices can be miniaturized and integrated into wafers and monolithic microwave integrated circuits (MMICs), which further reduces the size, weight, and power consumption of MMICs. The low power consumption attribute is particularly favorable for defense applications (e.g., sensors, autonomous devices, and handheld RF devices) as well as 5G telecommunication technologies.

Nanowires can be synthesized in either a top-down approach or a bottom-up approach. Top-down approaches reduce bulk pieces of materials into nanowires through lithography, etching, or other methods. Bottom-up approaches synthesize nanowires using deposition, growth techniques, and other methods. Electroplating is a bottom-up approach to synthesizing nanowires. Electroplating is a method used to grow highly oriented (i.e., crystallographically aligned) nanowires with the assistance of a porous template. Electroplating is a low-cost efficient method for fabricating nanowires but lacks repeatability control, nanowire length control, control of nanowire uniformity, and control of tuning alloy composition during nanowire growth.

While previous efforts have focused on growing and characterizing nanowire materials, there is a lack of process and approaches to integrate nanowires into electronic and radio-frequency devices.

SUMMARY OF THE DISCLOSURE

A method for fabricating magnetic nanowire composite electronic devices including providing a substrate, depositing an electrically conductive device pattern onto the substrate, depositing an electrically conductive transmission line onto the substrate, aligning the magnetic nanowire component to the device pattern, and securing the magnetic nanowire component to the substrate. The method further applying a first mask on top of the magnetic nanowire component, transmission line and device pattern, depositing an insulation layer on top of the magnetic nanowire component, transmission line, and device pattern, depositing a ground layer on top of the insulation layer; and removing the first mask.

A method for fabricating magnetic nanowire composite electronic including providing a magnetic nanowire composite device, applying a first mask on top of the magnetic nanowire component, depositing an electrically conductive device pattern onto the magnetic nanowire component, depositing an electrically conductive transmission line onto the magnetic nanowire component, removing the first mask, and depositing an insulation layer on top of the magnetic nanowire component, transmission line, and device pattern. The method further includes providing a substrate and securing the magnetic nanowire component to the substrate of the substrate.

A magnetic nanowire composite electronic device includes a substrate, an electrically conductive device pattern deposited onto the substrate or onto magnetic nanowire composite, an electrically conductive transmission line deposited onto the substrate, electrically conductive contact pads deposited onto the substrate, a magnetic nanowire component secured to substrate and aligned to the device pattern, and an insulation layer deposited on top of the magnetic nanowire component, transmission line, device pattern, and substrate.

BRIEF DESCRIPTION OF THE DRAWINGS

FIG. 3A is a perspective view of an immersion portion including a motor, drive shaft, anode, and a stirring element.

FIG. 3B depicts an immersion portion coupled to a chamber portion of a system for fabrication of nanowire composites including a motor and a drive shaft.

FIG. 3C depicts an immersion portion coupled to a chamber portion of a system for fabrication of nanowire composites including a drive shaft and a motor supported by a top surface of the chamber portion.

FIG. 4A is a cross sectional view of a template mounting assembly attached to a flange of a chamber.

DETAILED DESCRIPTION

Figure 1A:
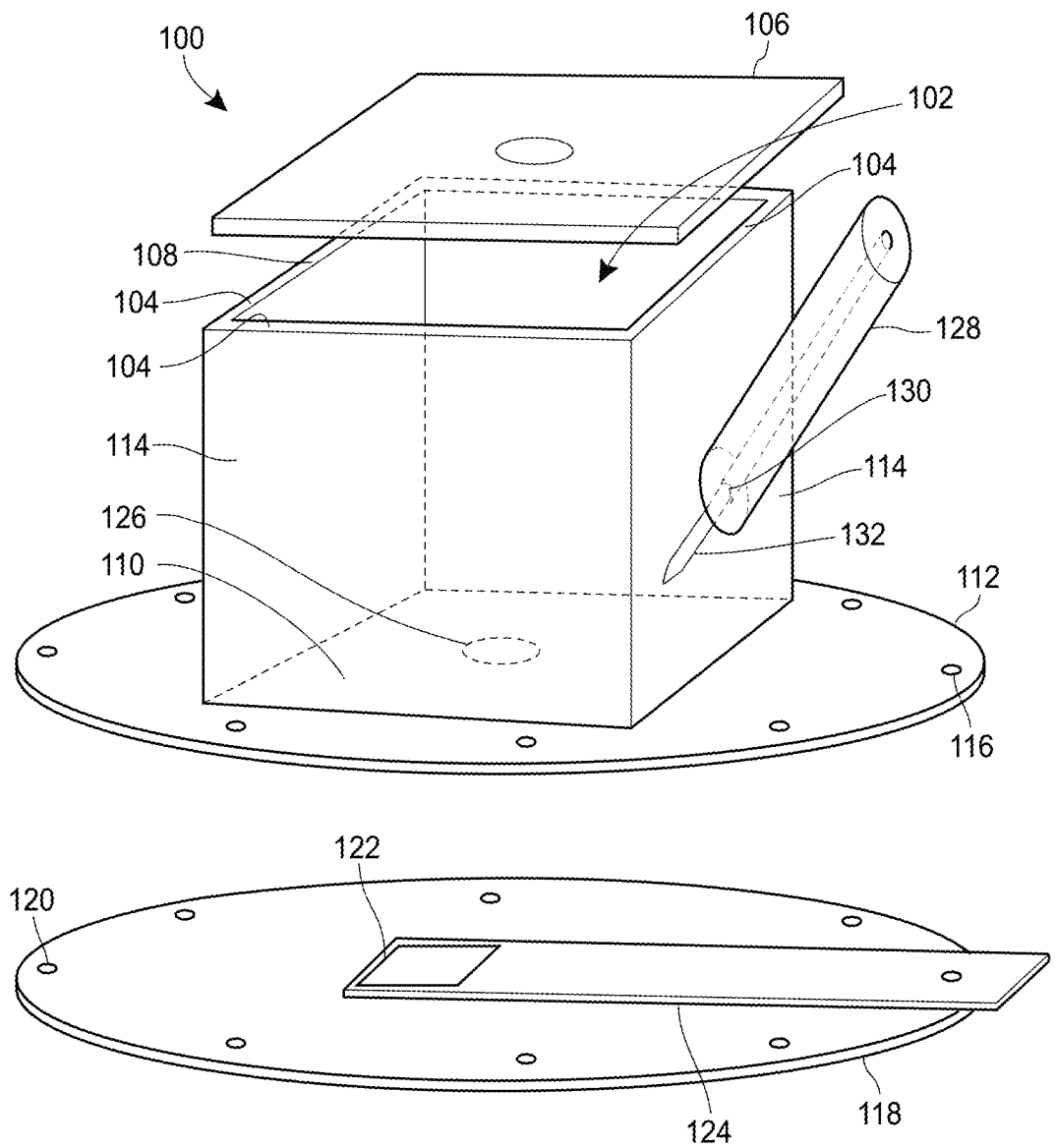
FIGS. 1A, is a perspective view of a chamber portion of a system for fabricating nanowire composites.

Passive radio-frequency (RF) components have the advantages of smaller size, lower power loss, and on-chip packaging potential. Passive RF components are used in radar technologies, satellite communication systems, handheld communication devices, and ad-hoc network products. Anisotropic magnetic nanowire-based composite (AMN) materials can serve as a magnetic field source for miniaturized passive RF devices. The capability to tailor an AMN composite's magnetization, ferromagnetic resonant frequency (FMR), FMR linewidth (OH), and dielectric properties is essential to fabricating RF devices operational at frequencies and frequency bands of interest.

One example of a passive RF component is a non-reciprocal passive circulator. Widely used in the RF device industry, circulators enable a single antenna to both transmit and receive signals simultaneously. Typically, bulky external magnets bias ferrite disks in circulators that operate at RF frequencies, resulting in larger RF circulator components. Hexagonal ferrites that can reserve magnetization without external magnets are proposed for miniaturized passive RF devices. However, due to the high ferromagnetic resonance (FMR) frequency of ferrites, ferrite self-biased circulators operate at frequencies in the K band (18-26 GHz), and higher. In addition, when ferrites are used for relatively low frequency (e.g., in K band), their bandwidth is very narrow. This is not desirable for radar and other RF communication applications. Currently, there is lack of self-biased ferrite alternatives that can drive passive RF devices at, and below, the Ka band. So far, the AMNs developed using the nanowires fabrication method claimed herein is the only solution of for fabricating passive RF devices that work in the frequency range from 5-25 GHz. The methods and devices described herein facilitate fabrication of compact, self-biased ferromagnetic circulators for use in RF technologies, and in particular RF technologies that operate from the C- to the K-band.

Magnetic nanowires can be plated into porous template materials, such as anodic aluminum oxide (AAO), to form AMNs with aligned nanowires. Due to the high aspect ratio (length-to-diameter ratio) of magnetic nanowires, magnetic shape anisotropy can generate remanent magnetization and coercivity of the AMNs. Depending on the nanowire composition in AMN materials, the AMN FMR can range from 10 to 25 GHz for FeNi and FeCo nanowires. Additionally, the FMR line width, saturation magnetization, remanent magnetization, self-biased field, and dielectric properties may all be tuned to fabricate RF devices that operate at desired frequencies and bandwidths with small loss. The methods and devices disclosed also provide a means for generating AMNs with greater nanowire uniformity, resulting in large nanowire length and narrower FMR linewidths, which is often desirable for RF components and devices. The methods and devices disclosed herein provide a means for tuning the magnetic and microwave behavior of AMNs across a wide range, for passive RF devices operating from the C- to the Ka-band. The methods and devices disclosed may be useful in the next generation of radar, satellite, and 5G wireless technologies.

Figure 1B:
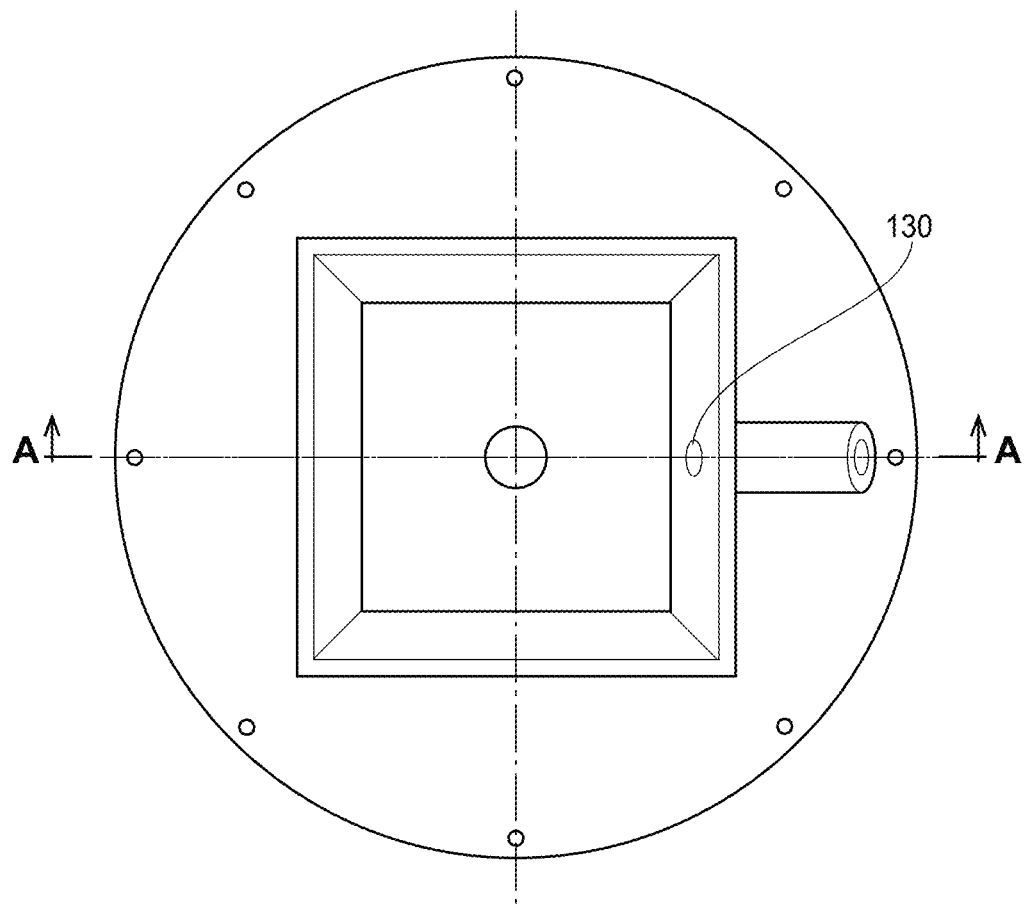
FIGS. 1B, is a top plan of a chamber portion of a system for fabricating nanowire composites.
Figure 1C:
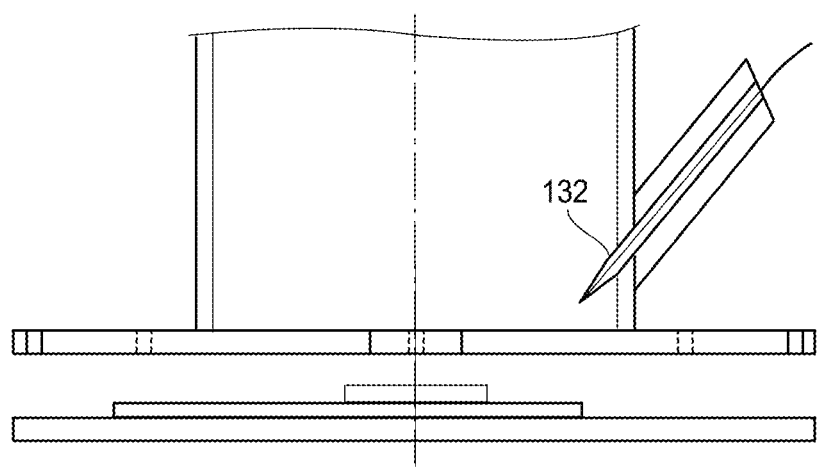
FIGS. 1C, is a front elevation cross-sectional view of a chamber portion of a system for fabricating nanowire composites.

FIGS. 1A, 1B, and 1C are perspective, top plan, and front elevation cross-sectional (along A-A) views, respectively, of a chamber portion 100 of a system for fabricating nanowires and nanowire composites. The chamber portion 100 includes a chamber 102 bounded by one or more perimeter walls 104, depending on the shape of the chamber 102. Specifically, a cylindrical chamber 102 may have a single perimeter wall 104, while a cuboid (i.e., rectangular parallelepiped) chamber 102, as depicted in FIG. 1, may have four perimeter walls 104. In an embodiments, an optional chamber cover 106, integrated with a motor, a shaft, a stirring element, an anode metal plate and electrical lead. The optional cover chamber 106 may be sized to be securely fixed to the top 108 of the chamber 102 in order to enclose the chamber 102 and secure other portions of the system (e.g., a motor, shaft, stirring element, anode, and/or electrical lead) to the chamber 102, as described below. A bottom wall 110 of the chamber 102 may include a flange 112 that, with the bottom wall 110, may be integrally formed with the perimeter walls 104 to form the chamber 102, or may be glued, soldered, welded, riveted, fused, or otherwise physically coupled to the perimeter walls 104.

The flange 112 may extend beyond exterior surfaces 114 of the perimeter walls 104 and may include a plurality of fastener apertures 116 or other means for securing the chamber 102 to an attachable plate 118 via corresponding fastener apertures 120 on the attachable plate. The attachable plate 118 and the flange 112, when securely coupled to one another, for example by inserting bolts through the fastener apertures 116, 120, cooperate to hold in place a porous template 122 and a cathode 124.

During operation, the cathode 124 and the porous template 122 are placed between the attachable plate 118 and the combined bottom wall 110 and flange 116 such that the porous template 122 is held against an aperture 126 in the bottom wall 110 of the chamber 102. As will be described in further detail below, the porous template 122 is exposed to an ionic solution in the chamber 102 through the aperture 126 in the bottom wall 110. The cathode 124 cooperates with an anode (described below) and a stirring element (described below) to cause magnetic nanowires to form in the pores of the porous template 122.

In embodiments, the chamber 102 includes a port 128 having a corresponding aperture 130 that facilitates insertion of a probe 132 (also referred to as a reference electrode) into the chamber 102 from outside the chamber 102. In particular, the probe 132 may be a voltage probe configured to measure a reference electrical field at a fixed location within the chamber 102. Correspondingly, then, the port 128 is preferably configured to cooperate with the probe 132 to repeatably and consistently position the probe 132 in a same, fixed position when the probe 132 is inserted into the chamber 102. In embodiments, a tip of the probe 132 extends to a fluid-filled space between the cathode 124 and the anode.

The chamber portion 100 and the attachable plate 110 may each be formed from non-metallic substances by machining, additive manufacturing, or the like. Additionally, while FIGS. 1A-1C depict a single aperture 126 in the bottom wall 110 of the chamber 102, the number of apertures 126 is selectable according to the desired number of AMN components to be created during a given execution of the production method. Of course, when multiple apertures 126 are included in the bottom wall 110, the side of the porous template 122 and the electrode 125 should be sized such that the porous template 122 (or multiple porous templates 122) is (are) exposed through each of the apertures 126, and such that the cathode 124 extends at least under the porous template 122 over the area of each of the apertures 126.

Figure 2A:
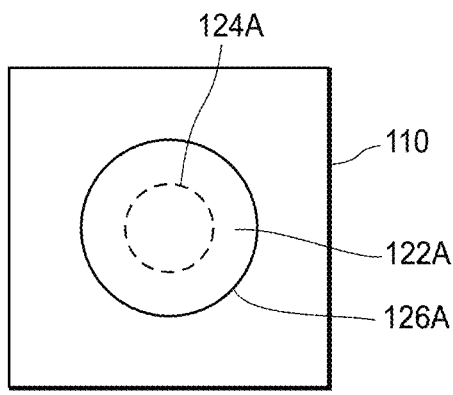
FIG. 2A depicts a top plan view of a bottom wall with a single aperture circular and circular cathode.

It should be understood that the size and shape of an AMN created using the devices and methods described herein may be regulated by the size and shape of the aperture 126, but could alternatively or additionally be regulated by the size, shape, and position of a mask plate (e.g., the mask plate 204 described further in reference to FIG. 4A), or by the size, shape, and position of a cathode. In embodiments that employ a cathode to define the size and shape of an AMN, the cathode may be a conductive layer deposited on a side of the porous template 122. FIGS. 2A-2D depict different possible configurations illustrating this point. Each of FIGS. 2A-2D depicts a top plan view of the bottom wall 110. In FIG. 2A, the bottom wall 110 includes a single aperture 126A, similar to the embodiments in FIGS. 1A-1C. However, in contrast with the embodiments depicted in FIGS. 1A-1C, in the embodiment depicted in FIG. 2A a cathode 124A, or a conductive layer, does not extend beyond the boundaries of the aperture 126A, but instead is sized and disposed to create an AMN roughly in the center of the aperture 126A. That is, while, in the embodiment of FIGS. 1A-1C, the size and shape of a resulting AMN is dictated by the size and shape of the aperture 126, in the embodiment depicted in FIG. 2A, the size and shape of a resulting AMN is dictated by the size and shape of the cathode 124A, or conductive layer, positioned beneath a porous template 122A exposed through the aperture 126A.

Figure 2B:
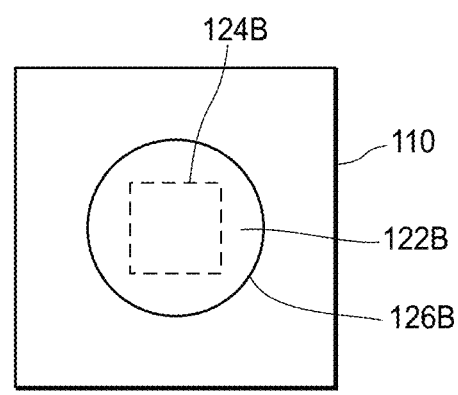
FIG. 2B depicts a top plan view of a bottom wall with a single circular aperture and a circular cathode.
Figure 2C:
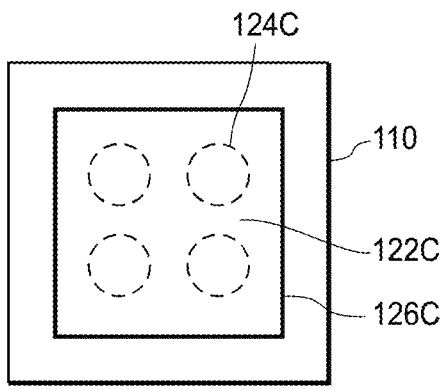
FIG. 2C depicts a top plan view of a bottom wall with a single rectangular aperture and four circular cathodes.
Figure 2D:
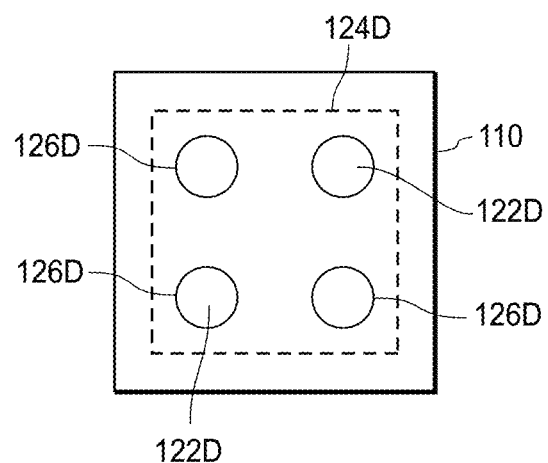
FIG. 2D depicts a top plan view of a bottom wall with a four circular apertures and a single rectangular cathode.

FIGS. 2B-2D further illustrate this principle. In FIG. 2B, a circular aperture 126B exposes a porous template 122B. However, beneath the porous template 122B, a rectangular cathode 124B, or conductive layer, would result in a corresponding rectangular AMN forming in the porous template 122B. In FIG. 2C, a single rectangular aperture 126C exposes a porous template 122C. Four circular cathodes 124C, or conductive layers, positioned beneath the porous template 122C but within the area of the porous template 122C exposed by the aperture 126C would result in four circular AMN devices forming in the porous template 122C. In FIG. 2D, the bottom wall 110, or a mask plate such as the mask plate 204 described further in reference to FIG. 4A, includes four circular apertures 126D exposing a porous template 122D (or multiple porous templates 122D). A single cathode 124D, disposed beneath the porous template(s) 122D, or conductive layer deposited on the porous template, would result in four AMNs being formed according to the size and shape of the apertures 126D. (Of course, multiple cathodes 124D, or conductive layers, could also be employed in this embodiment.) In embodiments, the bottom wall 104 may be selectively attachable to the perimeter walls 104 in a manner that is water-tight. In such embodiments, the bottom wall 104 may be replaced, for example, to provide an easy method of using a variety of "masks" having different patterns and numbers of apertures 126.

In embodiments, one or more thin conductive layers may be deposited onto a surface of the porous template 122 opposite the surface exposed to the chamber 102. An electrical connection may be made with the thin conductive layer(s) to allow the conductive layer(s) to act as the cathode 124 during fabrication. Deposition of a thin-conductive layer directly onto the porous template 122 localizes the applied electric field, and therefore, the plating of nanowires to the region of the porous template 122 directly between the thin-conductive layer, and the anode 156. The thin conductive layer deposited onto the porous template 122 may have a geometric shape for determining the shape of a magnetic nanowire composite fabricated according to the devices and methods disclosed herein. The thin conductive layer may exist on different regions of the porous template 122 so that multiple nanowire composites may be fabricated during a single nanowire fabrication session. In embodiments, the cathode 124 may be a filament, a foil, a plate, a thin film, a point, a disk, or another geometry or structure to provide a desired electric field in the chamber 102.

The chamber portion 100 is relatively static, having no moving parts and staying relatively fixed once the flange 112 is affixed to the attachable plate 118 and the reference probe 132 is inserted through the port 128. The chamber portion 100 is configured to cooperate with an immersion portion 150, depicted in a perspective view in FIG. 3A. The immersion portion 150 includes a motor 152, a driven shaft 154, a chamber cover 106, an anode 156, and a stirring element 158. The motor 152 operates to rotate the driven shaft 154 and the stirring element 158, the latter being a generally elongate member (e.g., a bar) fixed at the midpoint of its longitudinal axis to the driven shaft 154 such that the longitudinal axis of the stirring element 158 is generally orthogonal to the longitudinal axis of the driven shaft 154 and such that rotation of the driven shaft 154 results in corresponding rotation of the stirring element 158. The drive shaft is configured such that the driven shaft 154 passes through an aperture 164 in the chamber cover 106, the aperture 164 having a diameter exceeding that of the driven shaft 154 and matching the diameter of the cylindrical hollow body 160 such that the driven shaft 154 rotates freely. The anode 156 is disposed along the driven shaft 154 between the stirring element 158 and the motor 152. In the embodiment depicted in FIG. 3A, the anode 156 is fixedly coupled to a hollow body 160 through which the driven shaft 154 passes. The anode 156 may be coupled to a voltage source (not shown) by a wire (not shown) electrically coupled to the anode 156. Of course, while depicted as a hollow cylinder, the hollow body 160 may be any hollow three-dimensional body through which the driven shaft 154 may pass and to which the anode 156 may be fixed. The hollow body 160 may be supported by, or affixed to, the chamber cover 106, as depicted in FIG. 3A.

In embodiments, such as that depicted in FIG. 3A, the anode 156 is a disk. However, the anode 156 need not be a disk but may be multiple disks, a point anode such as the end of a wire, a rectangular or square plate, multiple rectangular or square plates, or other number of anodes and anode geometries capable of cooperating with the cathode 124 to provide a desired electrical field strength across the porous template 122.

The immersion portion 150 is configured to be coupled to the chamber portion 100 such that the immersion portion is partially immersed in a fluid disposed in the chamber 102. In embodiments, the motor 152 is configured to be mounted to a top surface 162 of the chamber cover 106, such that the driven shaft 154 passes through an aperture 164 in the chamber cover 106, as depicted in FIG. 3B. The cover 106 and immersion portion can be integrated by glue or made all at once by additive manufacturing. In still other embodiments, the motor 152 may be configured to be supported by the top 108 of the chamber 102, as depicted in FIG. 3C. For instance, brackets 166 may be fixedly mounted to the motor 152 to allow the motor 152 to perch atop the chamber 102 with the driven shaft 154 extending into the chamber 102 below. Either way, the hollow body 160 is generally supported either by the motor 152 or by the chamber cover 106, such that the hollow body 160 (and the anode 156 attached to it) remains stationary while the driven shaft 154 rotates within it. While not illustrated in FIGS. 3A-3C, it should be understood, that a power source provides power to the motor 152. The power source may be a battery, a power supply, or other power source mounted or affixed to the motor 152, chamber cover 106, or mounted remotely and electrically connected to the motor 152 by wires or electrical leads.

Figure 4C:
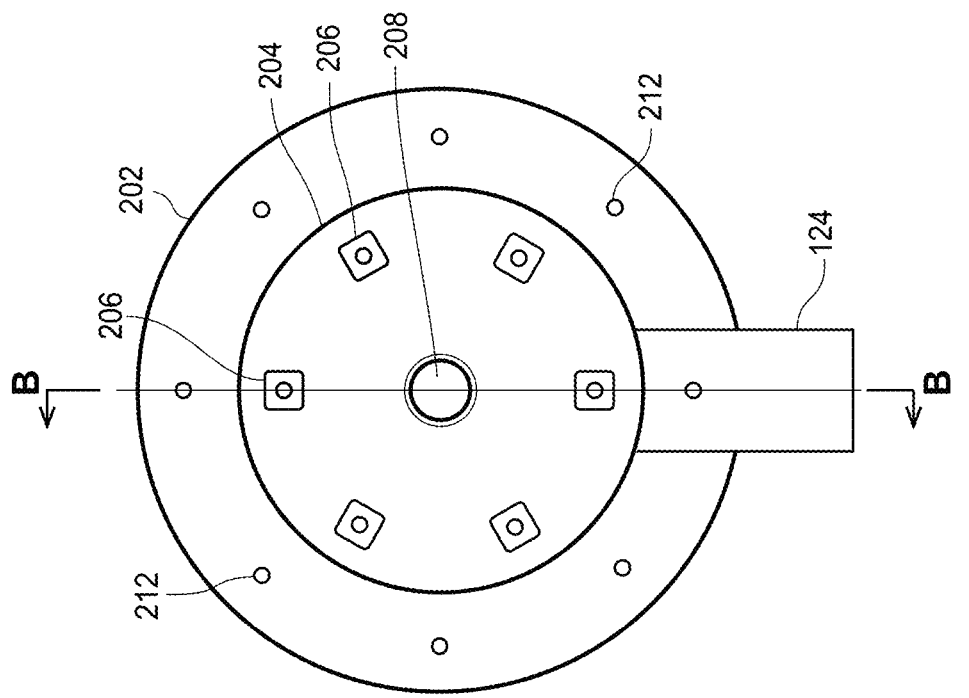
FIGS. 4B and 4C are top views of a template mounting assembly with a bottom mounting plate and a top mounting plate.
Figure 4B:
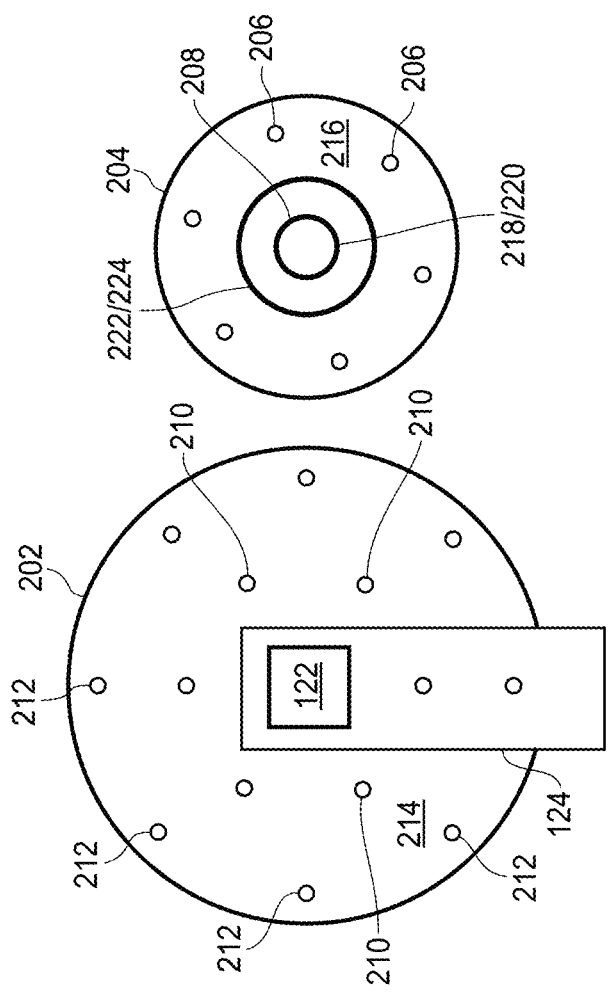

FIGS. 1A-1C depict an embodiment in which the porous template 122 and the electrode 124 are secured in place by the cooperation of the flange 112 and the attachable plate 118. FIGS. 4A-4C depict cross-sectional (along B-B) and top views of an alternative embodiment in which a template mounting assembly 200 may be secured to the flange 112, instead of the attachment plate 118 with the porous template 122 and the cathode 124. In the embodiments of FIGS. 4A-4C, the template mounting assembly 200 includes a supporting plate 202 and a top mounting mask plate 204. The top mounting mask plate 204 includes a plurality of peripheral fastener apertures 206 for mounting the top mounting mask plate 204 to the supporting plate 202, and one or more apertures 208 corresponding in size and shape to the aperture(s) 126 in the bottom wall 110 of the chamber 102. The size of the aperture 208 is generally smaller than the aperture 126 in the bottom wall 110. The aperture 208 is used to define the size and shape of the plating area according to an applications needs. In the embodiment, a circular shape aperture 208 is illustrated as demonstration for fabricating a round shape device.

The supporting plate 202 includes a plurality of inner fastener apertures 210 positioned and sized to cooperate with the peripheral fastener apertures 206 of the top mounting mask plate 204 such that the top mounting mask plate 204 and the supporting plate 202 can be secured to one another. The supporting plate 202 also includes a plurality of outer fastener apertures 212 positioned and sized to cooperate with the fastener apertures 116 of the flange 112 such that the template mounting assembly 200 may be secured to the flange 112.

The cathode 124 may be disposed on a top surface 214 of the supporting plate 202 and the porous template 122 disposed on the cathode 124. The porous template 122 and cathode 124 may be sandwiched between the top surface 214 of the supporting plate 202 and a bottom surface 216 of the top mounting mask plate 204, before the supporting plate 202 and the top mounting mask plate 204 are secured to one another.

The bottom surface 216 of the top mounting mask plate 204 may have a first annular channel 218 encircling the aperture 208, in which a primary O-ring seal 220 is disposed. The primary O-ring seal 220 may provide a seal between the porous template 122 and the top mounting mask plate 204 to prevent fluid from leaking from the chamber 202 around the porous template 122. In embodiments, a secondary O-ring seal 222 disposed in a second annular channel 224 provides a second barrier to prevent fluid from leaking from the chamber 202. The secondary O-ring seal 222 may engage the porous template 122 in some embodiments, while engaging the cathode 124 in other embodiments.

Figure 5A:
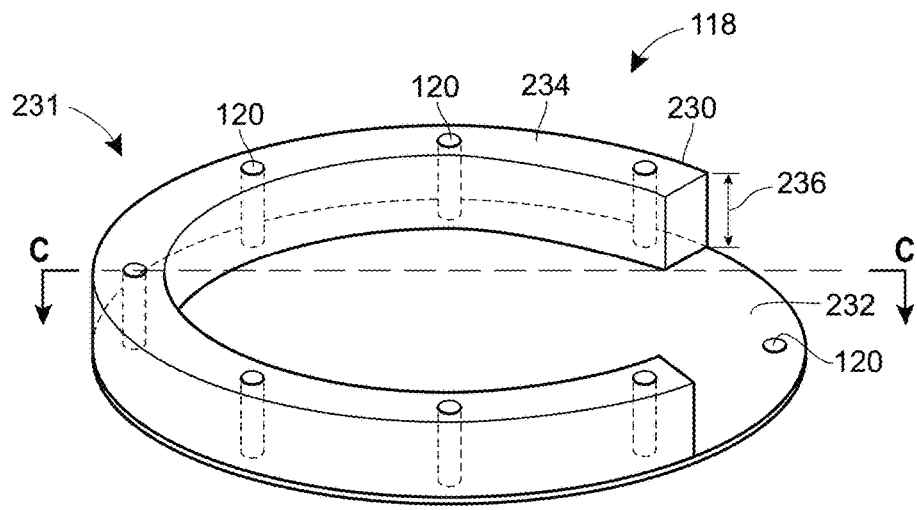
FIG. 5A is a perspective view of an attachable plate with a raised edge portion and a flat lower cradle.
Figure 5B:
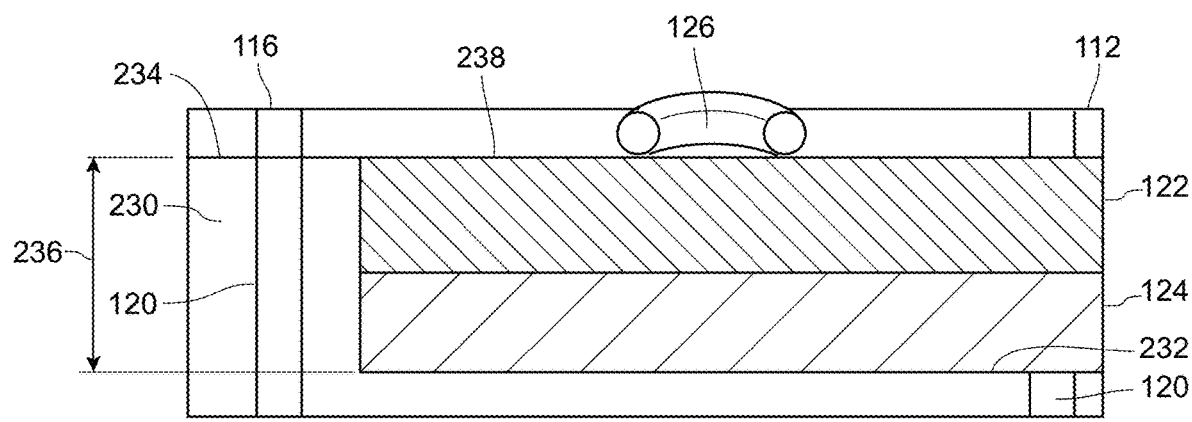
FIG. 5B is a cross-sectional view of an attachable plate with a raised edge portion, lower cradle, porous template, and a cathode.

In embodiments, the attachable plate 118 of FIG. 1A, or the supporting plate 202 of FIG. 4A, includes a raised edge portion 230 around a portion 231 of the perimeter, and the apertures 120 (in the case of the attachable plate 118) or 212 (in the case of the supporting plate 202) are disposed in, and extend through, the raised edge portion 230, as depicted in FIGS. 5A and 5B. FIG. 5A is a perspective view of an embodiment of the attachable plate 118. The attachable plate 118 has a flat lower cradle 232, and the raised edge portion 230 that protrudes from the flat lower cradle 232, a top surface 234 of the raised edge portion 230 being parallel to the flat lower cradle 232 and at a height 236 above the flat lower cradle 232. The raised edge portion 230 of the attachable plate 118 includes the apertures 120, having a size and placement on the raised edge portion 230 such that the apertures 120 align with the apertures 116 on the flange 112 (FIG. 1A) to attach the attachable plate 118 to the flange 112. As depicted in FIG. 5A, the flat lower cradle 232 may also have apertures 120 on areas of the lower cradle 232 to which the raised edge portion 230 does not extend.

FIG. 5B is a cross-sectional view of the attachable plate 118 taken along C-C in FIG. 5A, though FIG. 5B also depicts the cathode 124 and the porous template 122. As can be seen, the height 236 of the raised edge portion 230 above the flat lower cradle 232 is selected to correspond to the combined thickness of the cathode 124 and the porous template 122 such that, when the cathode 124 is placed on the lower cradle 232, and the porous template 122 is placed on top of the cathode 124, a top surface 238 of the porous template 122 is approximately at the same height as the top surface 234 of the raised edge portion 230. The attachable plate 118 may be attached to the flange 112 using fasteners as should be generally understood. When attached to the flange 112, the raised edge portion 230 of the attachable plate 118 is in direct contact with the flange 112. Typically, the porous template 122 is on the order of 100 μm thick and may be very brittle or easily damaged due to physical pressure, so the cooperation between the raised edge portion 230 and the flange 112 (in addition to the engagement of any O-ring seals that may be present in various embodiments) may prevent any damage to the porous template 122. The height 236 of the raised edge portion 230 depends on the combined thickness of the porous template 122 and the cathode 124. The height 236 of the raised edge portion 230 may be determined to allow for the cathode 124 and the porous template 122 to be contained between the lower cradle 232 and the flange 112, and provide a constant pressure between the cathode 122 and the porous template 122 (and any O-ring seals present). The constant pressure ensures a uniform electric field across the porous template 122 allowing for higher uniformity in the fabricated nanowire composite devices.

Figure 6:
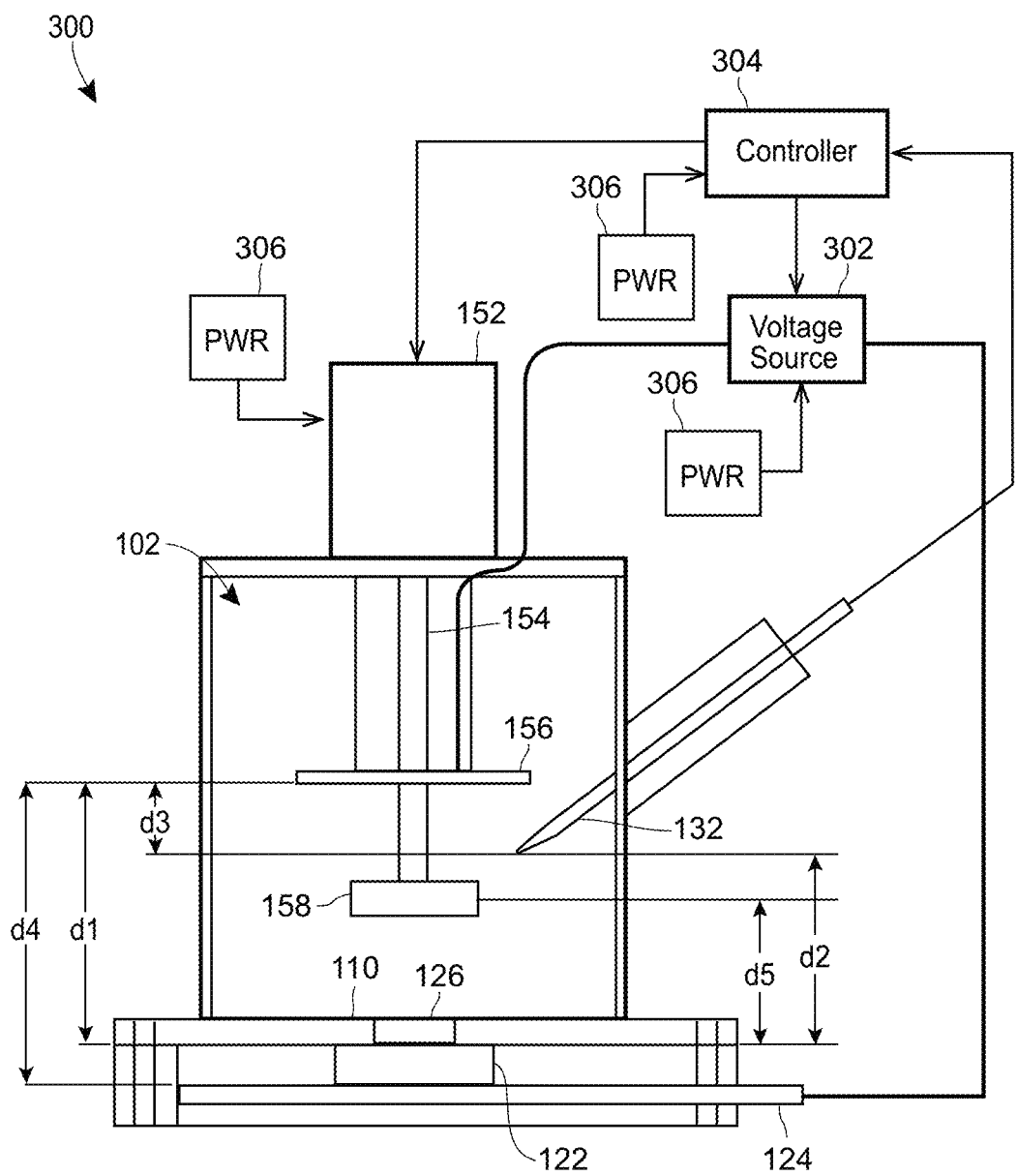
FIG. 6 is depicts a system for fabricating nanowire composites with a chamber portion, immersion portion, controller (potentiostat), voltage source, and probe (reference electrode).

Turning to FIG. 6, the chamber portion 100 is depicted combined with the immersion portion 150 and control and power components to form a magnetic nanowire component fabrication environment 300. A voltage source 302 electrically coupled to the anode 156 and to the cathode 124 provides a controllable voltage between the anode 156 and the cathode 124. A controller 304 (e.g., a potentiostat, bipotentiostat, polypotentiostat, etc.) is communicatively coupled to the probe 132 (e.g., the probe may be a reference electrode) and receives a voltage feedback signal from the probe 132. The controller 304 controls the voltage source 302 according to the desired voltage(s) to be applied between the anode 156 and the cathode 124 and the voltage feedback signal from the probe 132. In embodiments, the controller 304 is also communicatively coupled to the motor 152 to cause the motor 152 to rotate the stirring element 158. In the embodiment illustrated in FIG. 6, the controller, motor, and voltage source are each supplied power by different, independent power sources 306. In some embodiments, the controller 304 and voltage source 302 share a power source 306, and the motor 152 is supplied power by a separate power source 306. In yet other embodiments, a single power source 306 provides power to the voltage source 302, the controller 304, and the motor 152.

The anode 156 is positioned at a fixed distance, d1, from the porous template 122, the reference electrode 132 is fixed in a position at a constant distance, d2, from both the porous template 122 and at a fixed distance, d3, from the anode 156, the cathode 124 is fixed in a position at a constant distance, d4, from the anode 156, and the stirring element 158 is fixed in a position at a constant distance, d5, from the porous template 122 and stirs at a constant rotational velocity. In embodiments, d2 is smaller than d5, and d3 plus d2 is equal to d1. In other embodiments, d2 may be greater than d5. Due to the fixed distances of the components and the fixed speed of the stirring element 158, the uniformity of fabricated nanowire composites, and repeatability of fabricating nanowire composites with desired characteristics is improved compared to traditional methods. Maintaining the fixed distances and rotational speed across multiple fabrication sessions also allows for tuning of other parameters to achieve fabrication of a desired nanowire composite (e.g., tuning the ratio of ionic materials in the ionic fluid when generating a nanowire, tuning the amount of time of an applied voltage, the duty cycle of a pulsed applied voltage, etc.).

When the AMN fabrication environment 300 is employed, the chamber 102 may be filled with an ionic fluid such that the ionic fluid is communicated to the porous template 122 through the aperture 126 in the bottom wall 110, and such that the anode 156 and the stirring element 158 are immersed in the ionic fluid. A voltage may be applied between the anode 156 and the cathode 124 causing charged particles in the ionic fluid to migrate in the direction of the cathode 124 and, accordingly, toward the porous template 122 disposed between the cathode 124 and the ionic fluid. The voltage may be selected according to the ions in the ionic fluid and, specifically, may be selected to maximize the deposition of the ions into the porous template 122. The charged particles in the ionic fluid may enter the pores of the porous template 122, clinging to the walls of the pores and creating nanowire structures in the pores of the porous template 122. During the deposition of the charged particles into the porous template 122, hydrogen or other gases may be formed in the pores of the porous template 122 that may clog the pores and cause incongruities in the fabricated nanowires. However, the motor 152, rotating the driven shaft 154 and, in turn, causing the stirring element 158 to rotate, stirs the ionic fluid, perturbing any hydrogen build up and providing fresh ionic fluid solution to the pores allowing for the fabrication of more uniform nanowires in the porous template 122. As would be understood by a person of ordinary skill in the art, the term "plating" may also be used interchangeably with the terms "deposition" or "depositing" when discussing the above process of applying a voltage to an ionic fluid causing electroplating or electrodeposition of a material in the porous template 122.

Figure 7A:
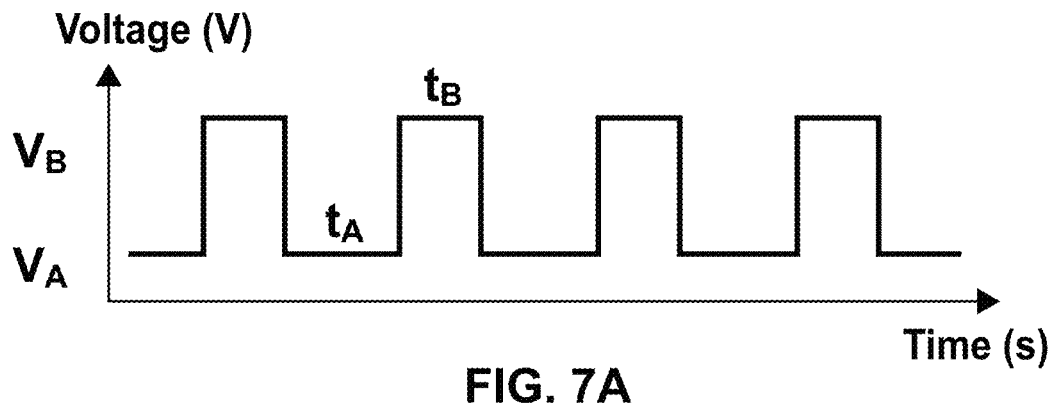
FIG. 7A is a plot of an example of a pulsed applied voltage for fabricating nanowire composites.

In embodiments, the ionic fluid may contain more than one ionic material and the applied voltage may be selected to cause more than one ionic materials to be deposited in the pores of the porous template 122. In some embodiments, the voltage may be a pulsed voltage that alternates between two or more voltages, each selected to correspond to a different one of the ionic materials, in order to fabricate alloy nanowires. FIG. 7A is a plot showing an example of a pulsed DC voltage applied over time to fabricate an alloy nanowire from ionic material A and ionic material B both in an ionic fluid solution. As is understood, different ionic materials have different threshold voltages for effecting deposition of the ionic materials. As illustrated in FIG. 7A the voltage $V_A$ is applied to plate material A into a porous template for a time $t_A$, and voltage $V_B$ is applied to plate material B into a porous template for a time $t_B$. The duty cycle of the pulsed applied voltage may determine the relative concentration of each of the ionic materials in the alloy nanowire. The overall time of the applied voltage or pulsed voltages determines the length of the nanowires in the nanowire composite.

Figure 7B:
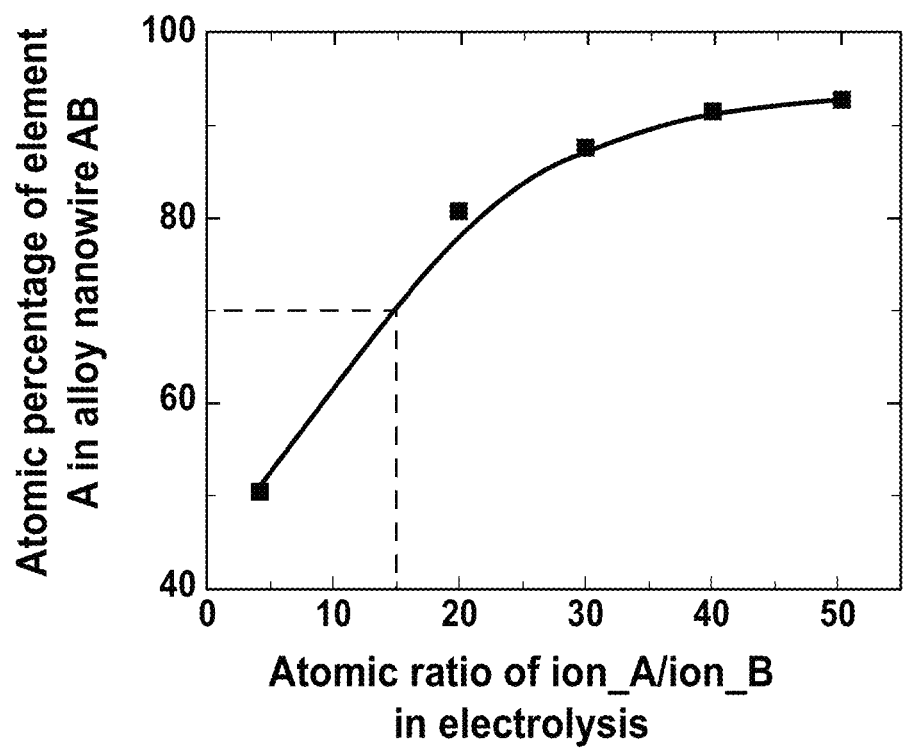
FIG. 7B is a plot illustrating the required overcompensation of ionic materials for fabrication of allow nanowires.

FIG. 7B is a plot showing the required overcompensation of ionic material A in the ionic fluid to achieve a desired elemental concentration of ionic material A in an alloy nanowire. The dotted lines show that the amount of ionic material A should be 15 times greater than the amount of material B in the ionic fluid to fabricate a nanowire with a 70% atomic percentage of material A. Together, modifying the duty cycle and voltages of the applied voltage pulse train and controlling the atomic ratio of different ionic materials in the ionic fluid, allow for the tuning of the electrical and magnetic properties of a nanowire composite device. Additionally, the applied voltage and the atomic concentration, in tandem with the constant distances of the various fabrication device components, allow for repeatability and uniform nanowire composites across multiple fabrication sessions. For example, FeNi nanowires with a concentration of $Fe_{20}Ni_{80}$ can be obtained by applying a $V_{Fe}$ of −1.2V and $V_{Ni}$ of −0.85V, $t_{Fe}$ of 0.8 seconds and $t_{Ni}$ of 1.2 seconds, and a $Ni^{2+}$ to $Fe^{2+}$ ratio of 21 in the electrolysis. It should be noted that the voltages $V_A$ and $V_B$ plotted in the pulse train of FIG. 7A, and in embodiments, are both negative value voltages.

In embodiments, the ionic fluid contained in the chamber 102 may contain metals such as nickel ions, silver ions, and/or copper ions, among other materials. The ionic material may be a magnetic material or combination of magnetic materials including iron, iron-nickel, cobalt, iron-nickel-cobalt, and iron-cobalt among others. In embodiments, the ionic fluid may contain more than one ionic material or any number of combinations of ionic materials.

Figure 8:
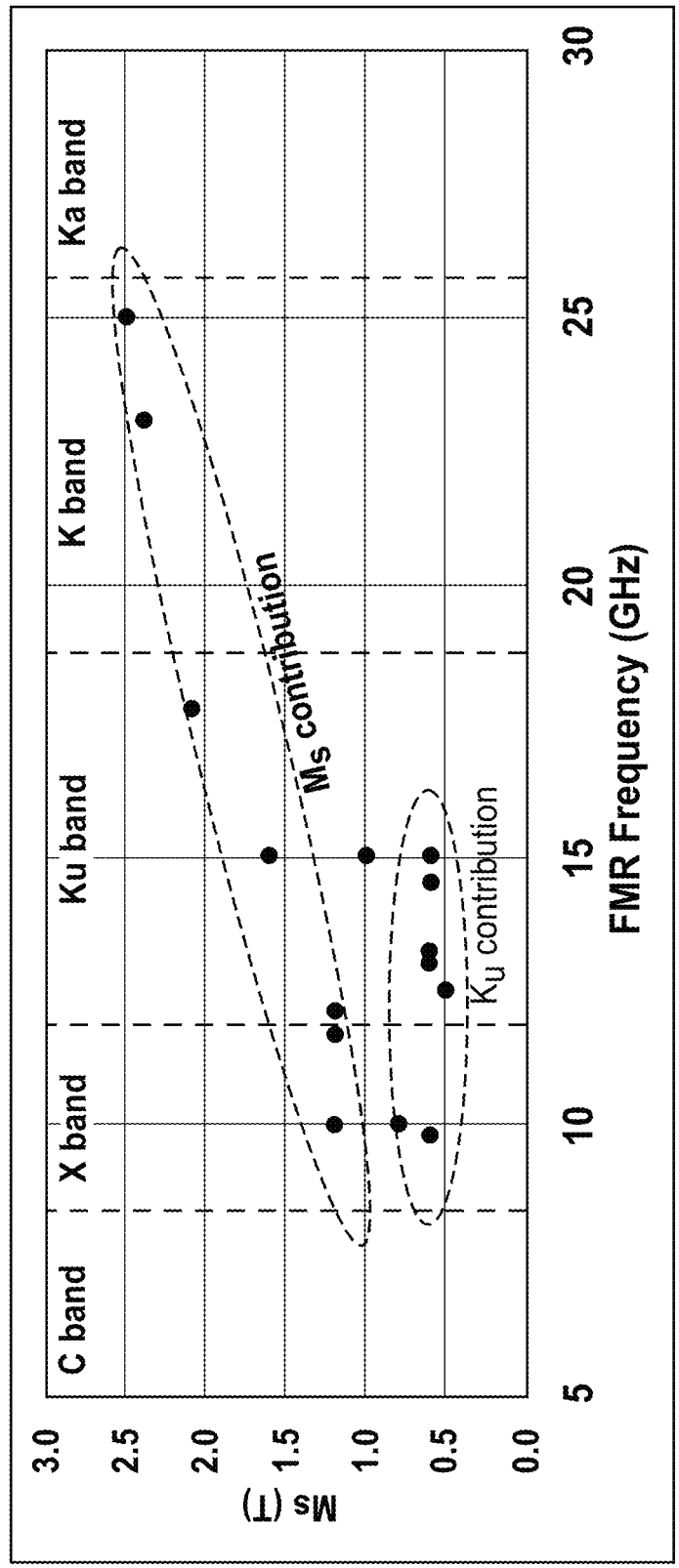
FIG. 8 is a plot of data demonstrating the ability to tune the saturation magnetization and ferromagnetic resonant frequency of a magnetic nanowire composite.

Tuning the magnetization, FMR, FMR line width, and/or the dielectric properties of nanowire composites allows for the fabrication of devices with a wide range of operational frequencies for use in a broad range of technological fields and, in contrast with prior art methods of fabricating AMN devices, can be consistently and repeatably accomplished using the devices and methods described herein. FIG. 8 is a plot of data demonstrating the ability to tune the saturation magnetization, $M_s$, and FMR of an anisotropic magnetic nanowires and magnetic nanowire composite materials. The data in FIG. 8 are generated by two different approaches for tuning the FMR of a particular anisotropic magnetic nanowire (AMN). The first approach is to tailor the saturation magnetization of the AMN by using different magnetic nanowire materials and/or material combinations to fabricate the nanowire as described previously. The dotted oval indicates that, by altering the nanowire material, the FMR of an AMN material may be tuned from the X-band up to nearly the Ka-band while maintaining a magnetization saturation of 2.5 T or less. The second approach to tailoring the FMR of an AMN material is by introducing magnetocrystalline anisotropy. Magnetocrystalline anisotropy is the alignment of the axes of magnetization of materials in a composite, and usually is related to the alignment of the principal axes of a crystal lattice during fabrication. Magnetocrystalline anisotropy is achieved by performing heat treatment on an AMN, which results in materials with high coercivities that are hard to demagnetize, often called "hard" ferromagnetic materials. Hard ferromagnetic materials are commonly used to make permanent magnets for use in any number of devices. Magnetocrystalline anisotropy helps prevent demagnetization that may occur due to external magnetic fields and thermal demagnetization among other factors. FIG. 8 shows that a magnetocrystalline anisotropy component, $K_u$, may also be used to tune the FMR of an AMN composite. The $K_u$ contribution shown in FIG. 5 allows for the tuning of the FRM frequency of an AMN composite from 10 to 15 GHz while maintaining a saturation magnetization of between 0.5 and 1 T. The methods of tuning the FMR frequency of fabricated AMN composites from 10 to 25 GHz provides the ability to fabricate components for use in RF passive devices operating between the C- and Ka-frequency bands. Combining the two approaches of using different magnetic nanowire materials, and introducing different degrees of magnetocrystalline anisotropy, may allow for further tuning of the saturation magnetization and the FMR of an AMN composite.

The tuning of an AMN composite's remanent magnetization, Mr, and MH loop squareness Mr/M s may also be performed according to the methods and devices disclosed herein. The tuning of an AMN composite's remanent magnetization may be accomplished by modifying the magnetic nanowire saturation magnetization, nanowire diameter, inter-wire distance, and nanowire magnetic anisotropy. The saturation magnetization and magnetocrystalline anisotropy may be modified by changing the nanowire material composition and heat treating the AMN composite, as discussed above. The pore diameter and interpore distance of the porous template 122 depend on the material makeup of the porous template 122 and may be limited by the material makeup of the porous template 122. For example, interpore distances of 65 nm and 125 nm are achievable in porous anodic aluminum oxide (AAO) templates, but interpore distances in the range between 65 nm and 125 nm are not readily achievable in AAO templates. Similarly, pore sizes of 50 μm and 200 μm are readily formed in AAO templates, but pore sizes in the range between 50 μm and 200 μm do not occur, due to the AAO material and fabrication processes. To fabricate nanowire composites with a wider range of nanowire diameters and inter-wire distances, the porous template 122 may be modified before electrodeposition of the ionic materials. One method for modifying the porous template is to deposit atoms on the inside of the porous template (i.e., on the walls of the pores) using atomic layer deposition (ALD), which allows for fine tuning of the pore diameters. ALD coating of same or different non-conductive materials such as oxides, nitrides, carbides, etc. may be performed to modify the pores of the porous template. Non-conductive ALD layers prevent the coating from interacting with or influencing an electric or magnetic field in the region of the porous template 122.

Figure 9:
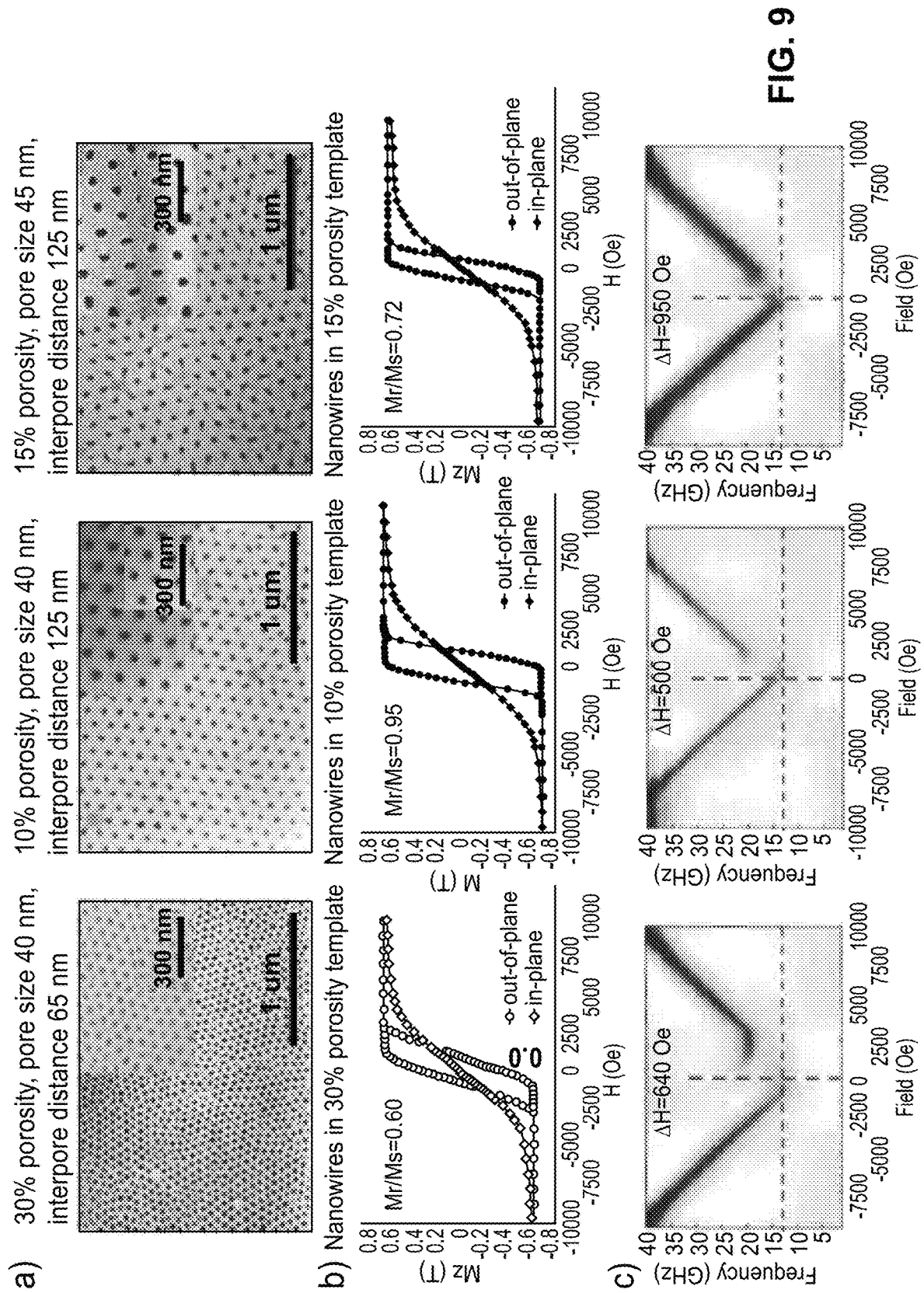
FIG. 9 is a set of scanning electron microscopy (SEM) images of porous templates with different porosity and pore size, as well as the magnetic hysteresis loops and the two-dimensional ferromagnetic resonance data of the nanowires grown in the corresponding templates.

FIG. 9 provides scanning electron microscope (SEM) images (top row) of porous AAO templates with different pore diameters and interpore distances, as well as the magnetic properties (middle row) and microwave properties (bottom row) of nanowires grown from the corresponding porous templates in each column. The porosity of the porous templates is defined as the volume of the template covered by pores, divided by the overall volume of the porous template. FeNi nanowires grown in the porous templates of FIG. 9 exhibited a higher remanence magnetization and a higher loop squareness at lower AAO porosity. The bottom row of FIG. 9 presents 2D-FMR data of the FeNi nanowires which show different FMR responses and linewidths at zero magnetic field for the different AAO templates. The crosshairs on each of the plots in the bottom row of FIG. 9 indicate the region of the plot that shows no externally applied magnetic field, and the corresponding FMR linewidth. The three different porous templates, represented by each column of FIG. 9, exhibit different FMR linewidths, ΔH, which are reported in units of Oersteds (Oe) in the top center of each plot in the bottom row of FIG. 9.

Figure 10:
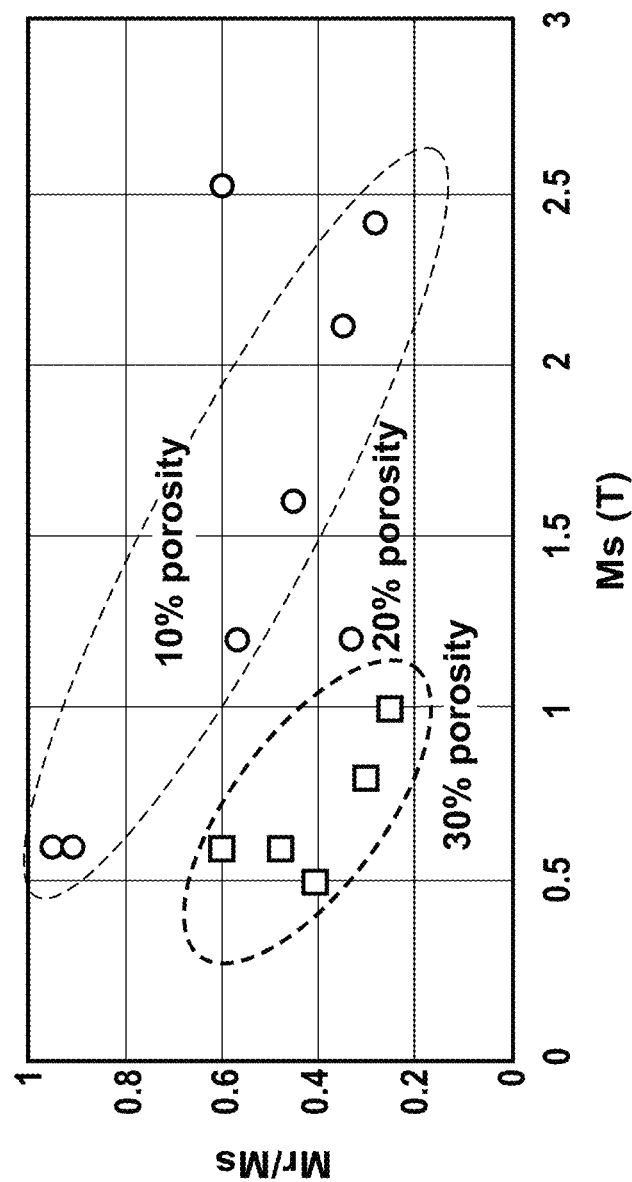
FIG. 10 is a plot illustrating the hysteresis loop squareness (i.e., the ratio of remanent and saturation magnetization, Mr/Ms) of fabricated magnetic nanowires of different saturation magnetization (Ms).

FIG. 10 is a plot showing the loop squareness of fabricated AMNs as a function of $M_s$ and AAO template porosity. Magnetic loop squareness is a measure of how many magnetic domains are supported by a magnetic nanowire composite. Squareness is also a measure of the hysteresis of a magnet comparing the remanent magnetization of a magnet to the saturation magnetization of the magnet. Higher squareness values are desired for permanent magnets while lower squareness values mean there is less hysteresis and easier demagnetization of a magnet.

Figure 11:
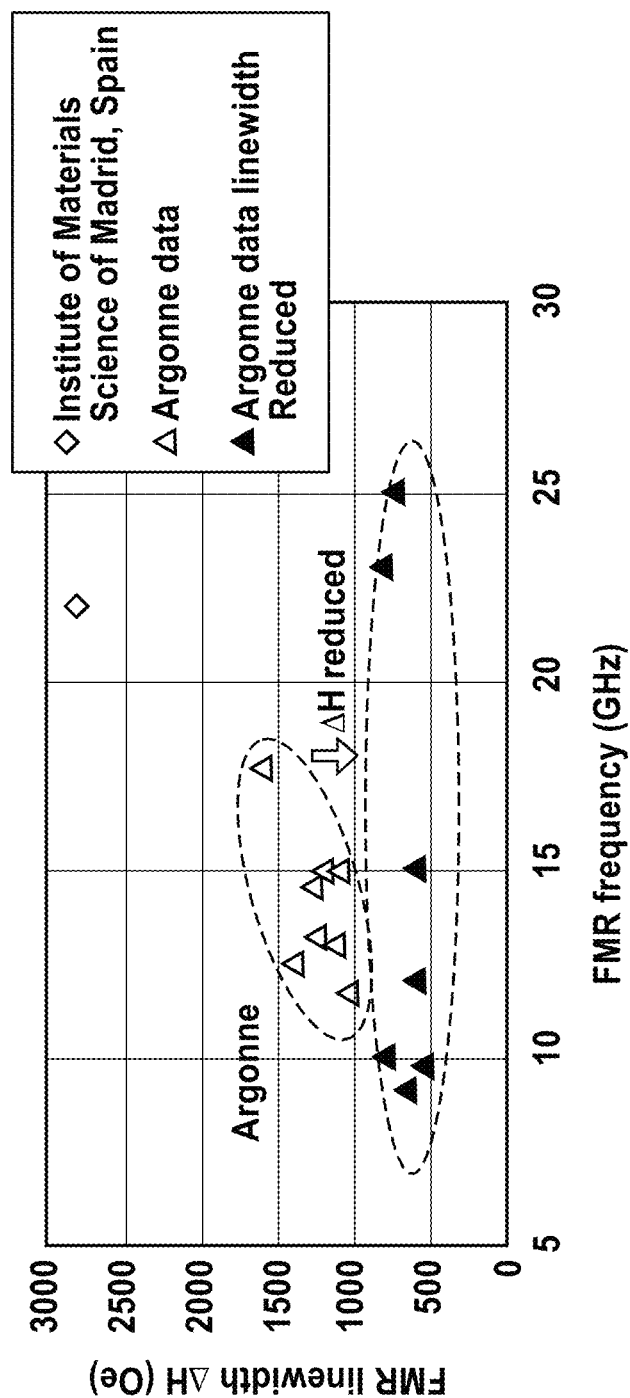
FIG. 11 is a plot demonstrating the tuning of the ferromagnetic resonant frequency linewidth of a magnetic nanowire composite.

FIG. 11 demonstrates the ability to tune the FMR linewidth of an AMN composite by controlling the magnetic nanowire materials and compositions of alloys during fabrication of a AMN, and changing the porosity diameter and diameter distribution of pores of AAO templates. FIG. 11 demonstrates that the FMR can be tuned from around 10 GHz up to 25 GHz while maintaining an FMR linewidth of less than 500 Oe, providing noticeable improvement of other AMN fabrication technologies that report FMR linewidths of greater than 2500 Oe at FMRs less than 25 GHz.

Further, the dielectric properties of the AMN may be tuned by modifying the magnetic nanowire length versus the porous template thickness, as well as by controlling the template material's dielectric properties. Filling more of a nanowire pore in the porous template results in longer nanowires corresponding to larger dielectric constants. Changing the amount of time that a voltage is applied, or the duty cycle and length of applied pulsed voltages, across the anode and cathode may change the length of the nanowires. Additionally, atomic layer deposition (ALD) can be used to deposit dielectric materials into the pores of the porous template to alter or fine-tune the dielectric properties of the template to generate devices with desired electrical or magnetic properties.

While ALD is described as the method for modifying the pore diameter and interpore distance of the porous template 122, techniques such as chemical vapor deposition, thin film deposition, other form of chemical deposition, epitaxial deposition, or laser ablation may be used to modify the pore diameter and interpore distance of the porous template.

The methods and nanowire fabrication devices disclosed facilitate creation of self-biased magnetization and microwave response for use in miniaturized components, with the possibility for chip integratibility. A nanowire-based magnetic component or disk for use in RF technologies may be cut or etched from a porous template with an AMN. Commonly, laser etching is employed to create AMN disks from AMNs in a porous template. However, the heat generated by laser etching or laser cutting has a tendency to cause demagnetization in nanowire-based magnetic components, or cause grain and grain boundary deformities resulting in less efficient devices or reduced magnetic field strengths due to the incongruities and, accordingly, is not optimal for high-performance devices. Three alternative methods of defining the shape and size of a magnetic nanowire component for use in RF technologies include: (1) electroplating nanowires through a mask such as the aperture 126 on the bottom wall 110 or another mask that can isolate the exposure of the porous template 122 to the ionic fluid; (2) plating nanowires in an area larger than the desired size and/or geometry and etching the magnetic nanowire component by chemical etchants through a mask; and (3) determining the plating region of nanowires by a cathode size and geometry. In embodiments that define the magnetic nanowire component by deposition of the cathode 124 onto the porous template 122, the conductive cathode layer may be removed through chemical etching to prevent the surface of the magnetic nanowire component from being conductive, or both sides may be covered with a non-conductive layer (e.g., through ALD coated $Al_2O_3$, or $SiO_2$ among others).

Figure 12:
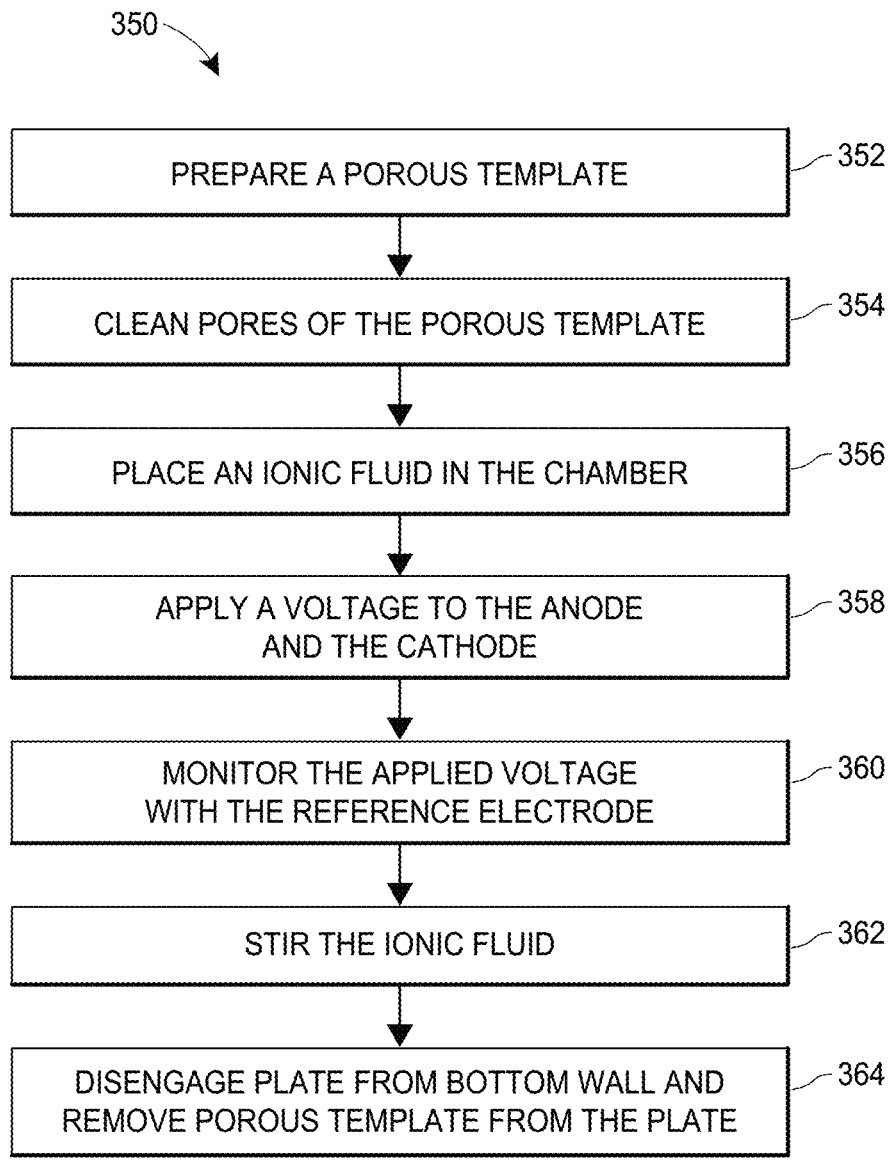
FIG. 12 is a flow diagram of a method for fabricating nanowire composites in a porous template.

FIG. 12 is a flow diagram of a method 350 for fabricating nanowire composites in a porous template. The method 350 may be performed by any of the embodiments of the systems and/or devices disclosed herein. Referring simultaneously to FIG. 1A and FIG. 12, the method 350 includes preparing a porous template, such as the porous template 122, (block 352) which may include altering the pore diameters of pores in the porous template 122, altering the interpore distance of the pores in the porous template 122, and/or altering the dielectric properties of the porous template 122 as described herein. Preparing the porous template 122 may include plating materials onto the internal surfaces of the pores of the porous template 122 that are the same material as the porous template 122, plating materials onto the internal surfaces of the pores of the porous template 122 that are a different material than the porous template 122, plating electrically non-conductive materials onto the internal surfaces of the pores of the porous template 122, plating electrically conductive materials onto the internal surfaces of the pores of the porous template 122, and/or plating materials onto the internal surfaces of the pores of the porous template 122 that have different dielectric properties than the material of the porous template 122.

Magnetization of an AMN may be required for AMN composite based magnetic nanowire devices. As discussed previously, the saturation magnetization may be tuned through modifying the nanowire lengths and/or the magnetocrystalline anisotropy of the nanowires. An external magnetic field may be applied to an AMN, with the external magnetic field having a field strength greater than the saturation magnetization of the magnetic nanowires in the magnetic nanowire component. The magnetization process described may allow for the generation of permanent magnetic components for use in compact RF devices.

Figure 13:
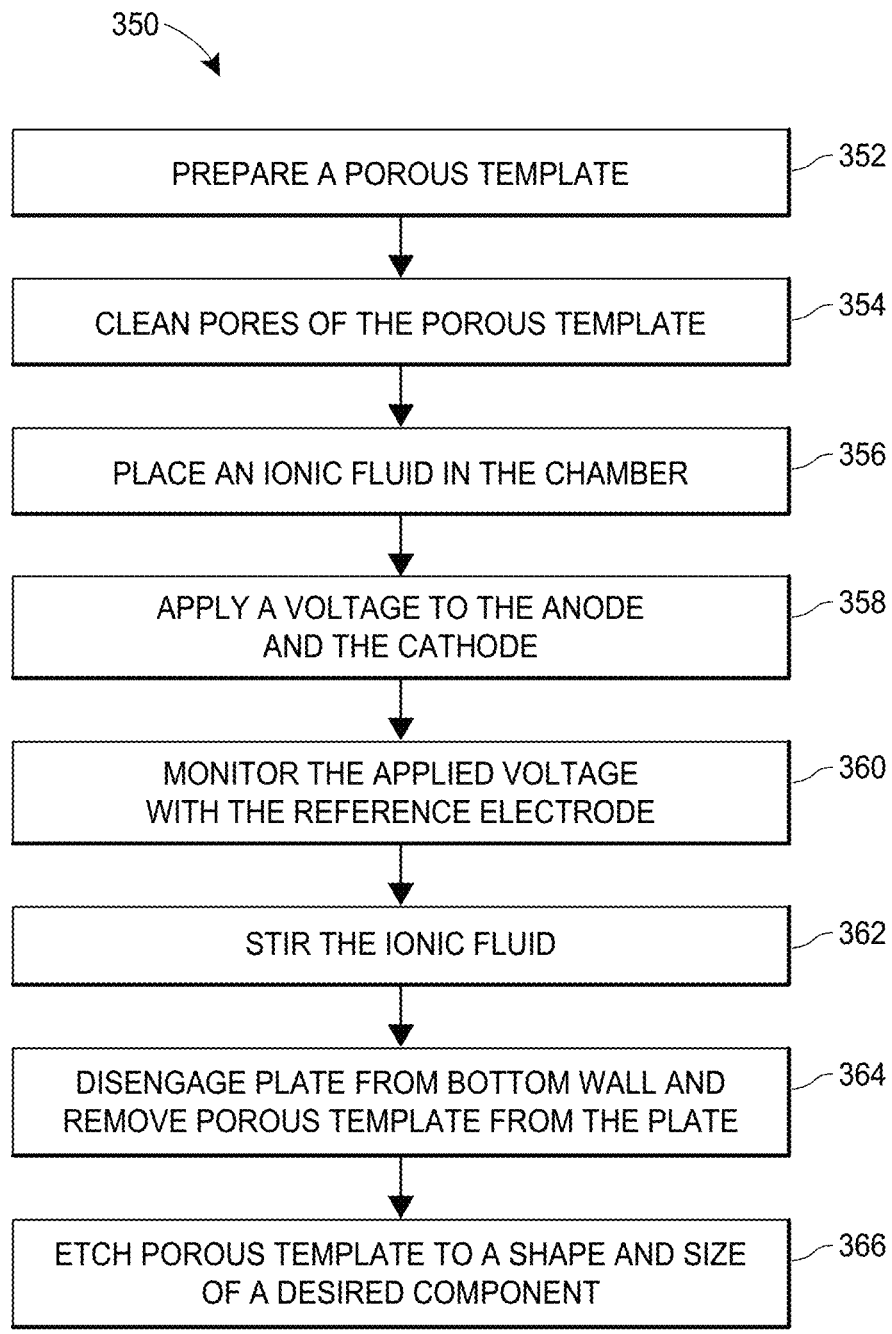
FIG. 13 is a flow diagram of a method for fabricating nanowire composites in a porous template and etch the porous template to a shape and size of a desired component.

FIG. 13 is a flow diagram of a method 350 for fabricating nanowire composites in a porous template. The method 350 may be performed by any of the embodiments of the systems and/or devices disclosed herein. Referring simultaneously to FIG. 1A and FIG. 13, the method 350 includes preparing a porous template, such as the porous template 122, (block 352) which may include altering the pore diameters of pores in the porous template 122, altering the interpore distance of the pores in the porous template 122, and/or altering the dielectric properties of the porous template 122 as described herein. Preparing the porous template 122 may include plating materials onto the internal surfaces of the pores of the porous template 122 that are the same material as the porous template 122, plating materials onto the internal surfaces of the pores of the porous template 122 that are a different material than the porous template 122, plating electrically non-conductive materials onto the internal surfaces of the pores of the porous template 122, plating electrically conductive materials onto the internal surfaces of the pores of the porous template 122, and/or plating materials onto the internal surfaces of the pores of the porous template 122 that have different dielectric properties than the material of the porous template 122.

The method 350 further includes cleaning the pores of the porous template 122 (block 354). In embodiments, cleaning the pores may include rinsing the porous template 122 with water, acetone, a de-oxidizing solution, ethanol, and/or other chemicals or solutions to remove any undesired materials (e.g., residual chemicals left from template fabrication, debris, etc.) from the pores of the porous template 122. Cleaning the pores may include placing the porous template 122 in an ultrasonic bath. Additionally, cleaning the pores may include placing the porous template 122 in a liquid bath agitated by a stirring device to cause a liquid to flow across the surface of the porous template 122 and/or through the pores of the porous template 122, which may be performed in the chamber 102 of the device 100.

An ionic fluid is placed in the chamber 102 (block 356). The ionic fluid may include one type of ionic material, multiple types of ionic materials, metals, and/or other ionic materials and combinations of ionic materials as described herein. The ionic fluid in the chamber 102 is in contact with the porous template 122 through the aperture 126 in the bottom wall 110 of the chamber 102. A voltage is then applied across the anode 156 (FIG. 3A) and the cathode 124

(block 358). The applied voltage may be a pulsed voltage, a pulsed voltage that alternates between two different non-zero voltage values, a square voltage pulse, a triangular voltage pulse, a saw tooth voltage pulse, or another type of pulsed voltage pattern. Additionally, the voltage values of the pulsed voltages may be determined by multiple types of ionic materials in the ionic fluid, and the duty cycle of the pulsed voltages may be determined by a desired alloy composition of the fabricated nanowires. The voltage is monitored with the probe 132 during nanowire fabrication (block 360). The ionic fluid is stirred (block 362) by a stirring element 158 to remove any gasses or bi-products in the pores caused by the plating of the nanowires, and further to ensure that fresh ionic fluid is supplied to the pores during fabrication.

After nanowires have been plated in the porous template 122, the method 350 may further include disengaging the attachable plate 118 from the bottom wall 110 of the chamber 102, and the porous template 122 may be removed from the attachable plate 118 (block 364). The porous template 118 may then be etched to create an AMN component with a desired shape and size (block 366). The etching may be performed by laser etching, chemical etching, wet etching, dry etching, anisotropic etching, plasma etching, or another type of etching. The resultant AMN component may then be magnetized and integrated into an RF device as described herein.

Figure 14:
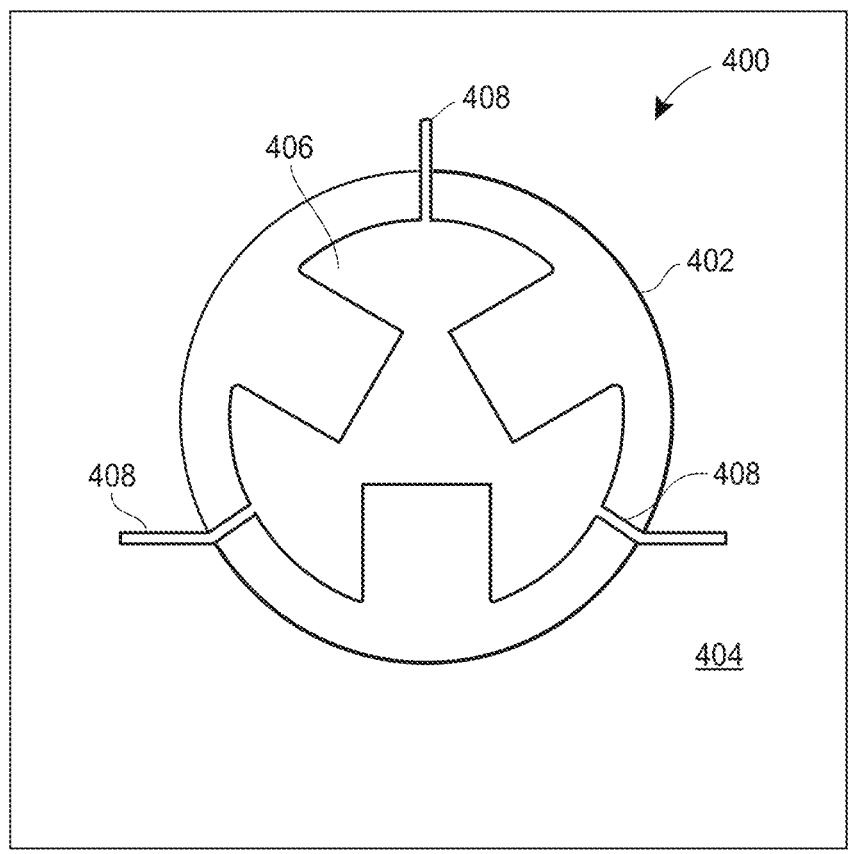
FIG. 14 illustrates an embodiment of a radio-frequency device with an integrated magnetic nanowire component.

FIG. 14 illustrates an embodiment of an RF device 400 having an integrated AMN component 402. The RF device 400 of FIG. 14 is one implementation of an RF circulator. The RF device 400 includes a substrate 404, a conductive device pattern 406, and transmission lines 408, in addition to a metal ground layer (not pictured in FIG. 14).

Figure 15:
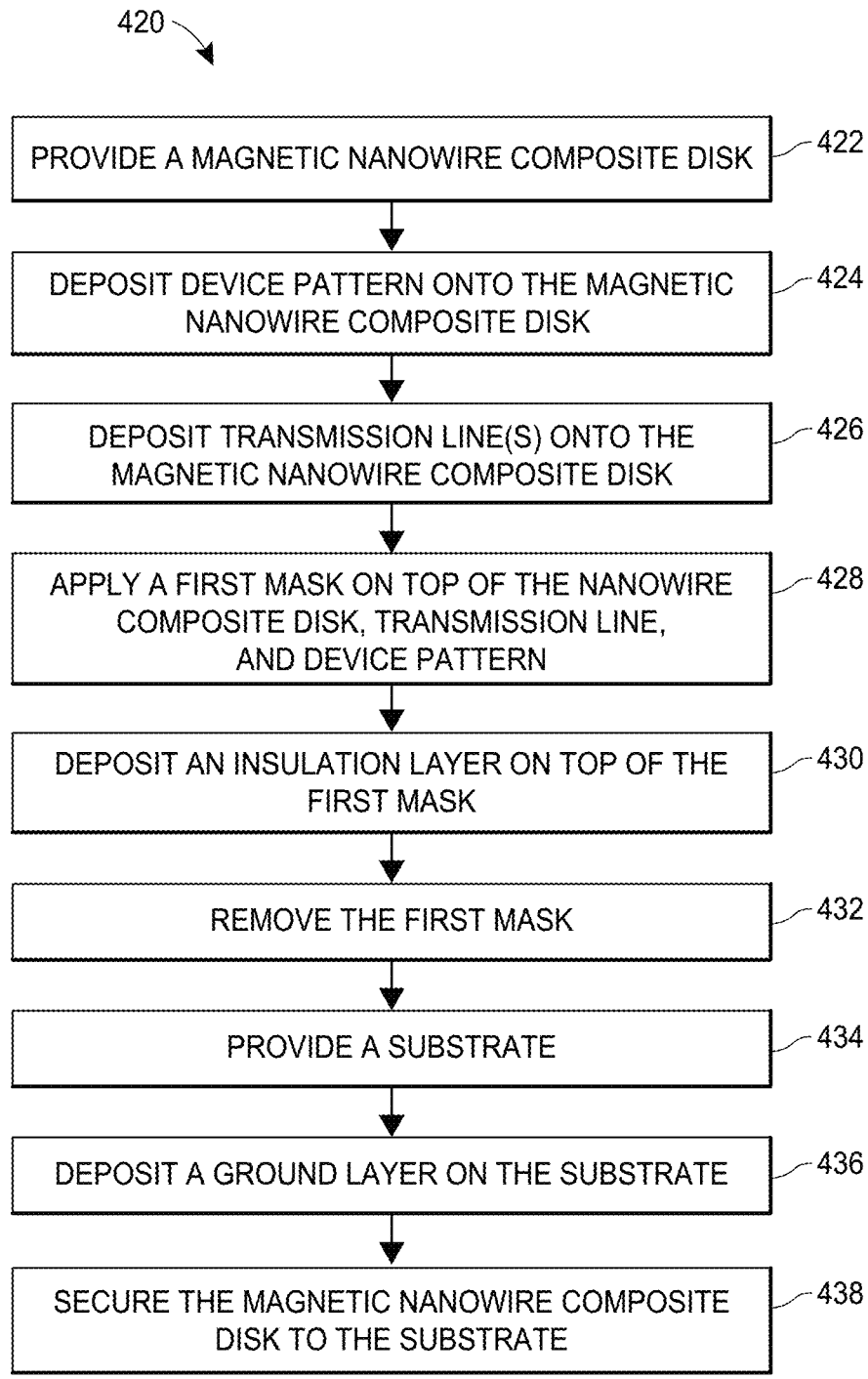
FIG. 15 is a flow diagram of a method for fabricating a radio-frequency device with an integrated magnetic nanowire component.

FIG. 15 is a flow diagram of a method 420 for fabricating an RF device with an integrated AMN component disk, such as the circulator RF device 400 of FIG. 14. Referring now simultaneously to FIG. 14 and FIG. 15, an AMN component 402 is provided (block 424). The AMN component 402 may be fabricated by the methods and devices disclosed herein, and in particular by the method 350 of FIG. 13. A conductive device pattern 406 is deposited onto the component 402 (block 430). The device pattern 406 defines the electric circuit design of the RF device 400. Transmission line(s) 408 are deposited onto the AMN component 402 (block 432) at the same time with the conductive pattern or after the conductive pattern is deposited. The transmission lines 408 provide electrical communication between the RF device 400 and other electrical devices, components, and/or systems. The device pattern 406 and transmission line 408 can be deposited by thin film growth such as sputtering or evaporation, or printing, or plating, or adhering metal foil, or other integration method. Additionally, the method 420 may further include depositing a dielectric cap and/or an insulating cap on top of the AMN component 402 (block 428), before depositing the device pattern 406 and transmission line(s) 408. The dielectric cap and/or insulating cap prevent the device from being electrical short. The RF device 400 can be integrated to the other electrical devices by glue or adhesive, bonding, or other securing method (block 436). A ground layer may be introduced to the surface of the RF device 400 on the opposite side of the device patter 406 (block 426).

The substrate 404 is provided (block 434). In embodiments, the substrate 404 may include silicon, a III-V compounds, a II-VI compound, an insulator, or another substrate material. The AMN component 402 is secured to the substrate 404 (block 434). The AMN component 402 may be secured to the substrate 404 by means of direct heterogeneous sample growth, a glue or adhesive, bonding, or other securing method.

Figure 16:
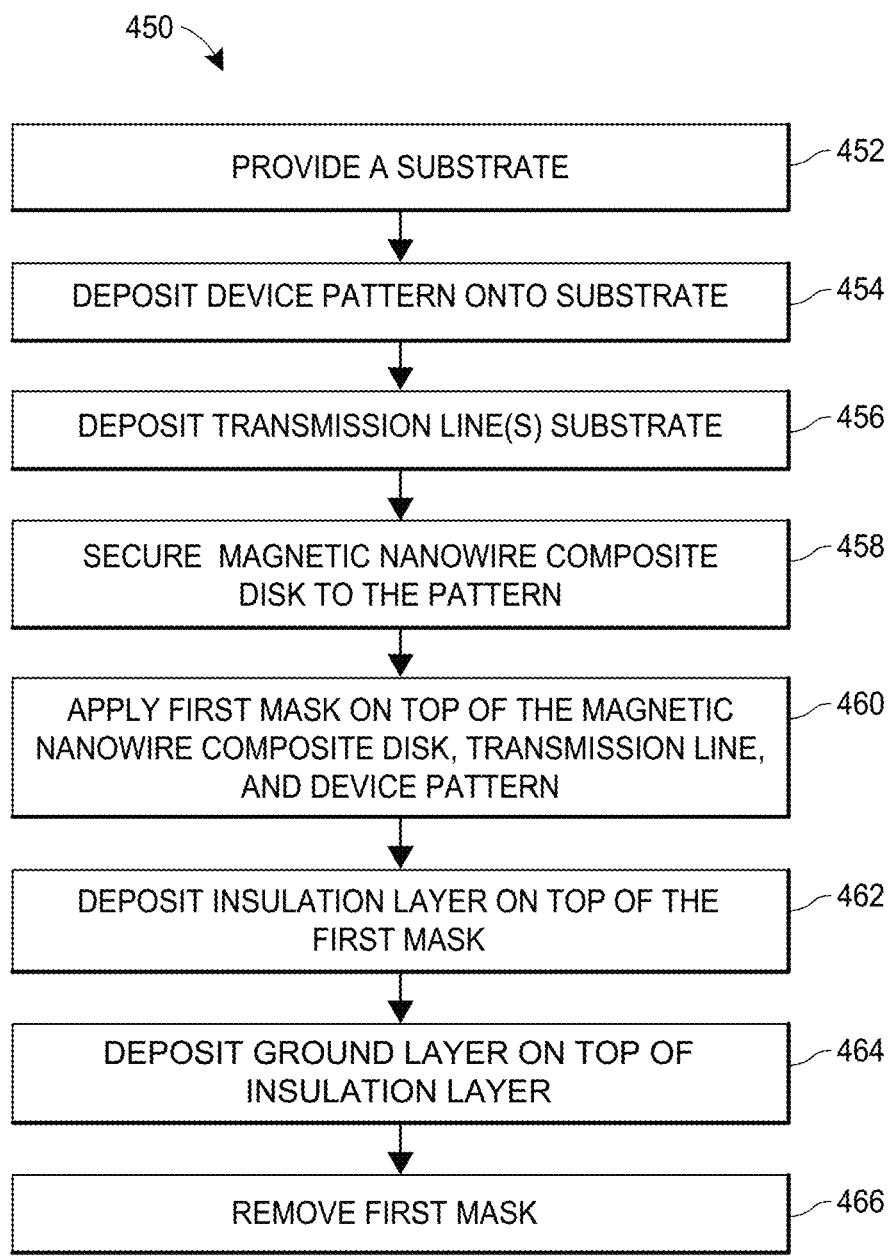
FIG. 16 is a flow diagram of embodiment of a method for fabricating a radio-frequency device using a flipped design approach.
Figure 17A:
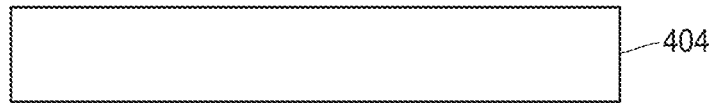
FIGS. 17A-17E illustrate a fabrication process for integrating a magnetic nanowire component into a radio-frequency device using a flipped design approach.
Figure 17B:
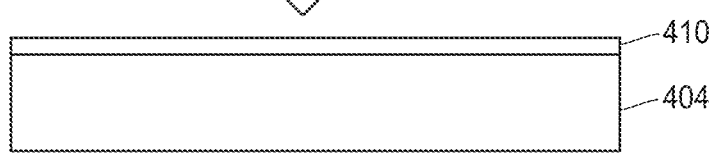
Figure 17C:
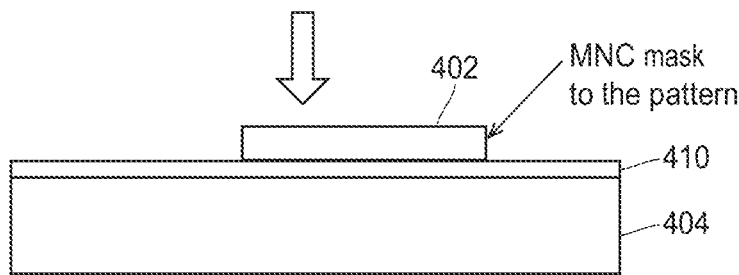

An AMN component may be integrated into an RF device using a flipped design approach, compared to that of the method 420 of FIG. 15. FIG. 16 is a flow diagram of embodiment of a method 450 for fabricating an RF device using a flipped design where the device pattern 406 is deposited on the substrate 404, rather than, as disclosed in the method 420 of FIG. 15, the device pattern 406 being deposited on the AMN component 402. FIGS. 17A-17E illustrate a fabrication process for integrating an AMN component into the RF device 480 (illustrated in FIG. 17E) according to the method 450 of FIG. 16. Referring now simultaneously to FIGS. 16 and 17A-17E, a substrate 404 is provided (block 452). In embodiments, the substrate 404 may include silicon, germanium, a III-V compounds, a II-VI compound, an insulator, or another substrate material. In FIG. 17B, a conductive device pattern 406 and transmission line(s) 408 are deposited on the substrate 404 (block 454 and block 456). The conductive device pattern 406 deposited on the substrate 404 defines the electrical design or circuit of the RF device 480. The transmission line(s) 408 deposited onto the substrate 404 provide electrical communication between the RF device 480 and other components, hardware, systems, and electrical devices. In FIG. 17C, the AMN component 402 is secured to the substrate 404 (block 460) and aligned to the conductive device pattern 406. The AMN component 402 may be secured to the substrate 404 by means of a non-conductive glue or adhesive, bonding, epoxy, or other securing method. The AMN component 402 may be fabricated by the methods and devices disclosed herein, and in particular by the method 350 of FIG. 13.

Figure 17D:
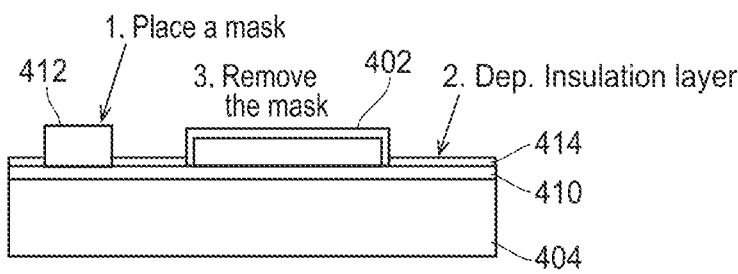

In FIG. 17D a mask is applied to the AMN component 402, transmission line(s) 408, and substrate 404 (block 462). An insulating layer 410 is deposited on top of the transmission lines (block 464). Other areas are covered by the mask and are not exposed to the insulating layer. The mask is removed after the deposition of insulating layer.

Figure 17E:
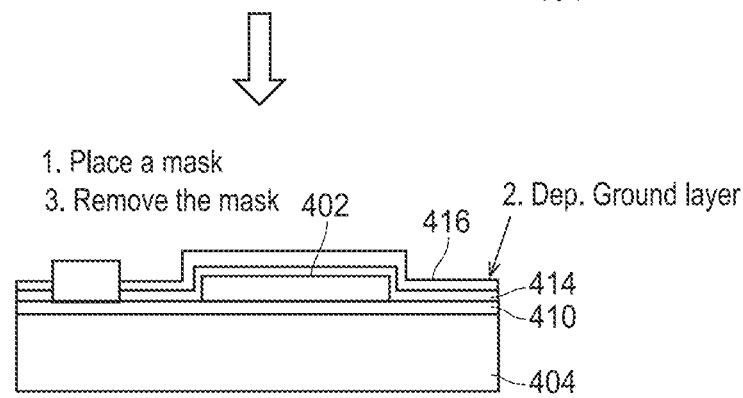

In FIG. 17E a conductive ground layer 414 is deposited on top of AMN disk and the substrate (block 468). The transmission line(s) 408 is protected by the insulating layer and is not grounded. The conductive device pattern is covered by the AMN disk and is not grounded. The RF device 480 may be a circulator, such as the circulator illustrated in FIG. 14, or any other RF device requiring a magnetic component. If additional device patterns need to be integrated, an insulating or dielectric layer can be deposited on top of the ground layer, followed by another conductive device pattern and interconnect lines (not depicted in FIG. 17E). Finally, an insulating cap layer may be deposited on top of the device for packaging.

What is claimed is:

1. A method for fabricating magnetic nanowire composite electronic devices the method comprising:
   providing a substrate;
   depositing an electrically conductive device pattern onto the substrate;
   depositing at least one electrically conductive transmission line onto the substrate;
   securing a magnetic nanowire component to the electrically conductive device pattern, the magnetic nanowire component being aligned to the electrically conductive device pattern;
   applying a first mask on top of the magnetic nanowire component, transmission lines and the substrate;

depositing an insulation layer on top of the transmission lines;
removing the first mask;
depositing a ground layer on top of the magnetic nanowire component and the substrate; and
depositing an insulating or dielectric layer on top of the ground layer.

2. A method according to claim 1, further comprising fabricating a magnetic nanowire component that further comprises:
preparing a porous template;
cleaning pores of the porous template;
placing an ionic fluid in a chamber, wherein the porous template is exposed to the ionic fluid through an aperture in the chamber;
applying a voltage across an anode and a cathode creating an electric field across the ionic fluid and porous substrate;
monitoring the applied voltage with a reference electrode; and
stirring the ionic fluid.

3. A method according to claim 1, wherein removing the first mask occurs before the deposition of the ground layer and further includes applying a second mask before depositing the ground layer; and removing the second mask after depositing the ground layer.

4. A method according to claim 1, wherein depositing an insulating or dielectric layer on top of the ground layer comprises depositing an insulating layer on top of the ground layer.

5. A method according to claim 1, wherein depositing an insulating or dielectric layer on top of the ground layer comprises depositing a dielectric layer on top of the ground layer.

6. A method according to claim 1, wherein the magnetic nanowire component is secured to the electrically conductive device pattern by an adhesive substance.

7. A method according to claim 1, wherein the magnetic nanowire component is bonded to the electrically conductive device pattern.

8. A method according to claim 1, wherein the electrically conductive device pattern comprises a circulator device pattern.

* * * * *